US010241840B2

(12) United States Patent
Tsai et al.

(10) Patent No.: US 10,241,840 B2
(45) Date of Patent: Mar. 26, 2019

(54) RESOURCE BASED VIRTUAL COMPUTING INSTANCE SCHEDULING

(71) Applicant: VMware, Inc., Palo Alto, CA (US)

(72) Inventors: Po-An Tsai, Cambridge, MA (US); Sahan Gamage, West Lafayette, IN (US); Rean Griffith, Oakland, CA (US)

(73) Assignee: VMware, Inc., Palo Alto, CA (US)

( * ) Notice: Subject to any disclaimer, the term of this patent is extended or adjusted under 35 U.S.C. 154(b) by 103 days.

(21) Appl. No.: 15/283,274

(22) Filed: Sep. 30, 2016

(65) Prior Publication Data

US 2018/0095776 A1  Apr. 5, 2018

(51) Int. Cl.
*G06F 9/46* (2006.01)
*G06F 9/50* (2006.01)

(52) U.S. Cl.
CPC .......... *G06F 9/5077* (2013.01); *G06F 9/505* (2013.01); *G06F 9/5083* (2013.01)

(58) Field of Classification Search
CPC .... G06F 9/4558; G06F 9/5077; G06F 9/5083; G06F 2009/4557; G06F 2009/45595
See application file for complete search history.

(56) References Cited

U.S. PATENT DOCUMENTS 7,062,527 B1* 6/2006 Tyrrell, III ............ G06F 9/5044
709/201
7,203,944 B1* 4/2007 van Rietschote ... G06F 9/45533
718/1
9,537,891 B1* 1/2017 Walter ................... H04L 63/20
2010/0312466 A1* 12/2010 Katzer ............... G01C 21/3492
701/533

OTHER PUBLICATIONS

Al-Fares et al., "Hedera: Dynamic flow scheduling for data center networks", In Proceedings of the 7th USENIX Conference on Networked Systems Design and Implementation, NSDI'10, Berkeley, CA, USA, 2010. USENIX Association, 15 pages.
Arpaci-Dusseau et al., "The architectural costs of streaming i/o: A comparison of workstations, clusters, and smps", in HPCA, pp. 90-101, IEEE Computer Society, 1998, 12 pages.

(Continued)

*Primary Examiner* — Camquy Truong
(74) *Attorney, Agent, or Firm* — Thomas | Horstemeyer, LLP

(57) ABSTRACT

Examples provide two-tiered scheduling within a cluster. A coarse-grained analysis is performed on a candidate set of hosts to select a host for a virtual computing instance based on optimization of at least one resource. A host is selected based on the analysis results. The identified virtual computing instance is placed on the selected host. A fine-grained analysis is performed on a set of communication graphs for a plurality of virtual computing instances to generate a set of penalty scores. A set of communicating virtual computing instances are selected based on the set of penalty scores. A first virtual computing instance from a first host is relocated to a second host to minimize a distance between the first virtual computing instance and a second virtual computing instance. Relocating the first virtual computing instance reduces at least one penalty score for the set of communicating virtual computing instances.

14 Claims, 13 Drawing Sheets

(56) References Cited

OTHER PUBLICATIONS

Ballani et al., "Towards predictable datacenter networks", In Proceedings of the ACM SIGCOMM 2011 Conference, SIGCOMM '11, pp. 242-253, New York, NY, USA, 2011, 12 pages.
Benson et al., "Network traffic characteristics of data centers in the wild", In Proceedings of the 10th ACM SIGCOMM Conference on Internet Measurement, IMC '10, New York, NY, USA, 2010, 14 pages.
Billaud et al., "Hierarchical qos for packet scheduling in a hypervisor", in Proceedings of the 8th ACM European Conference on Computer Systems, EuroSys '13, pp. 309-322, New York, NY, USA, 2013, 14 pages.
Erickson et al., "Using network knowledge to improve workload performance in virtualized data centers", in IEEE International Conference on Cloud Engineering (IC2E), 2014, 10 pages.
Ghodsi et al., "Dominant resource fairness: Fair allocation of multiple resource types", In Proceedings of the 8th USENIX Conference on Networked Systems Design and Implementation, NSDI'11, Berkeley, CA, USA, 2011, USENIX Association, 14 pages.
Unknown, "Enter the Andromeda zone—Google Cloud Platforms latest networking stack", Google Inc., captured Jul. 21, 2016, http://googlecloudplafform.blogspot.com/2014/04/enter-andromeda-zone-google-cloud-plafforms-latest-networking-stack.html, 6 pages.
Grandl et al., "Multi-resource packing for cluster schedulers", in ACM SIGCOMM 2014 Conference, SIGCOMM'14 Chicago, IL, USA, Aug. 17-22, 2014, 2014, 12 pages.
Gulati et al., "VMware Distributed Resource Management: Design, Implementation and Lessons Learned", The VMware Technical Journal (VMTJ), 2012, 20 pages.
Hindman et al., "Mesos: A platform for finegrained resource sharing in the data center", In Proceedings of the 8th USENIX Conference on Networked Systems Design and Implementation, NSDI'11, pp. 295-308, Berkeley, CA, USA, 2011, USENIX Association, 14 pages.
Isard et al., "Quincy: Fair scheduling for distributed computing clusters", In Proceedings of the ACM SIGOPS 22Nd Symposium on Operating Systems Principles, SOSP '09, New York, NY, USA, 2009, 20 pages.
Jain et al., "B4: Experience with a globally-deployed software defined wan", In Proceedings of the ACM SIGCOMM 2013 Conference on SIGCOMM, SIGCOMM '13, New York, NY, USA, 2013, 12 pages.
Leland et al., "On the self-similar nature of ethernet traffic (extended version)" IEEE/ACM Trans. Netw., 2(1):1-15, Feb. 1994, 15 pages.
Medina et al., "Traffic matrix estimation: Existing techniques and new directions", In Proceedings of the 2002 Conference on Applications, Technologies, Architectures, and Protocols for Computer Communications, SIGCOMM '02, New York, NY, USA, 2002, 14 pages.
Ousterhout et al., "Sparrow: distributed, low latency scheduling", In Proceedings of the Twenty-Fourth ACM Symposium on Operating Systems Principles, ACM, 2013, 16 pages.
Panigraphy et al., "Heuristics for vector bin packing", Technical report, Microsoft Research, 2011, 14 pages.
Schwarzkopf et al., "Omega: Flexible, scalable schedulers for large compute clusters", in Proceedings of the 8th ACM European Conference on Computer Systems, EuroSys '13, New York, NY, USA, 2013, 14 pages.
Shieh et al., "Seawall: Performance isolation for cloud datacenter networks", In Proceedings of the 2Nd USENIX Conference on Hot Topics in Cloud Computing, Hot-Cloud'10, pp. 1-1, Berkeley, CA, USA, 2010, 7 pages.
Verma et al., "Large-scale cluster management at Google with Borg", In Proceedings of the European Conference on Computer Systems (EuroSys), Bordeaux, France, 2015, 18 pages.
Unknown, "IP Flow Information Export", Wikipedia, captured Jul. 21, 2016, https://en.wikipedia.org/wiki/IP_Flow_Information_Export, 4 pages.
Zhang et al., "Fast accurate computation of large-scale ip traffic matrices from link loads", In ACM SIGMETRICS, pp. 206-217, 2003, 12 pages.
Zhang et al., An informationtheoretic approach to traffic matrix estimation, In Proceedings of the 2003 Conference on Applications, Technologies, Architectures, and Protocols for Computer Communications, SIGCOMM '03, pp. 301-312, New York, NY, USA, 2003, 12 pages.

\* cited by examiner

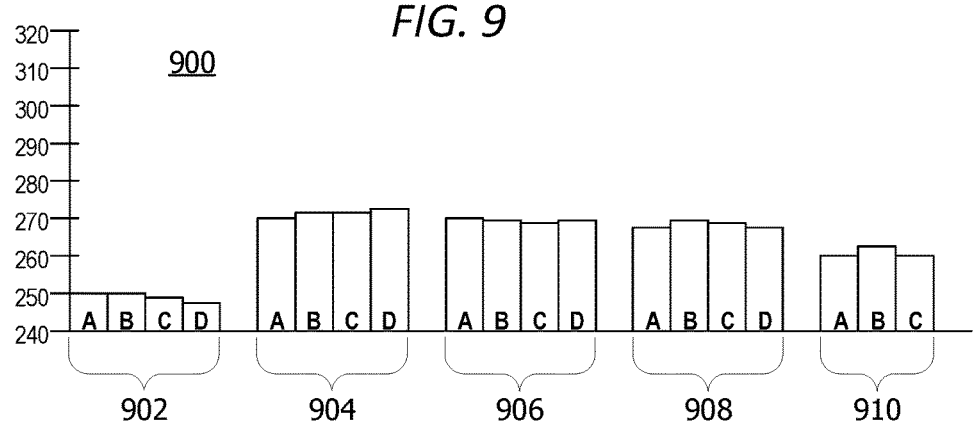
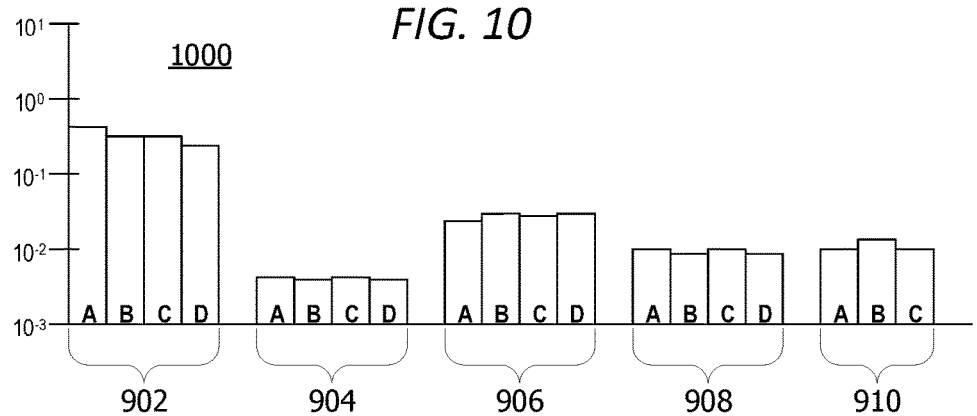

RESOURCE BASED VIRTUAL COMPUTING INSTANCE SCHEDULING

BACKGROUND

A cluster is a collection of hosts in which processor, memory, storage, and other hardware resources are aggregated for utilization by the hosts in the cluster. A host is capable of running one or more virtual computing instances, such as virtual machines (VMs). A VM typically includes an operating system (OS) running one or more applications to perform a workload. VMs running on a host utilize cluster resources to perform the workloads. However, if a VM is placed on a host with insufficient resources available to meet the resource demands of the VMs, the host becomes overloaded.

In some existing solutions, one or more VMs on an overloaded host may be relocated to a different host in the cluster in an attempt to remediate the overloaded host. A scheduler is utilized in some systems to select a host for placement of VMs and balance the resource utilization among the hosts in the cluster. However, these placement and relocation decisions are frequently made based on insufficient information regarding resource demands of the VMs and resource availability of the hosts. This frequently results in sub-optimal placement of VMs, unbalanced hosts, network saturation, overloading of network links, and/or overall inefficient utilization of available cluster resources.

SUMMARY

Examples of the disclosure provide a two-tiered scheduler. A selection component selects a candidate set of hosts from a plurality of hosts within a cluster. The plurality of hosts is associated with a set of virtual computing instances. A coarse-grained scheduler component performs a coarse-grained optimization on the candidate set of hosts to select a host for an identified virtual computing instance based on at least one resource. The identified virtual computing instance is placed on the selected host. A fine-grained scheduler component relocates a first virtual computing instance in a set of communicating virtual computing instances from a first host in the cluster to a second host in the cluster based on at least one penalty score associated with the set of communicating virtual computing instances. Relocating the first virtual computing instance to the second host reduces at least one penalty score.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is an exemplary graph illustrating system utilization of different scheduling algorithms under different system sizes.

FIG. 10 is an exemplary graph illustrating system imbalance of different scheduling algorithms under different system sizes.

Corresponding reference characters indicate corresponding parts throughout the drawings.

DETAILED DESCRIPTION

Figure 1:
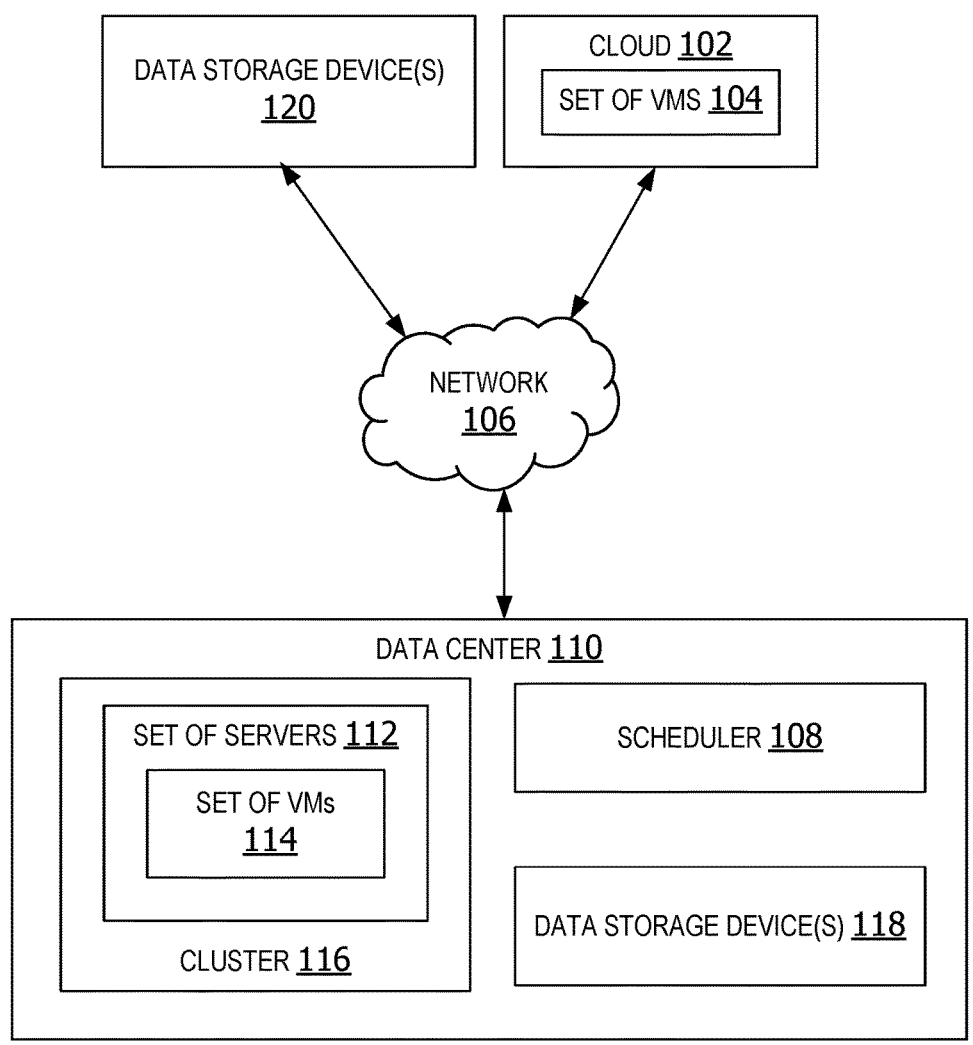
FIG. 1 is an exemplary block diagram illustrating a system for a two-tiered scheduler.

Referring to the figures, examples of the disclosure enable a coarse-grained scheduler and a fine-grained scheduler for network aware distributed resource scheduling. In some examples, a selection component selects a predetermined number of hosts from each queue in a plurality of resource-based host queues to create a candidate set of hosts. A powering-on virtual computing instance or a migrated virtual computing instance is placed on a host selected from the candidate set of hosts. Selecting a host from the candidate set rather than selecting the host from all hosts in a cluster increases host selection speed, reduces processor load, and conserves memory.

In other examples, the candidate set of hosts is selected from a plurality of hosts based on sampling from priority queues. This enables a scheduler that is scalable in both virtual computing instance and host dimensions because it uses sampling instead of an exhaustive search to find a suitable host for an incoming or resource-wise distressed virtual computing instance. This sampling further enables schedulers to operate in larger-scale environments.

A coarse-grained scheduler selects a host from the candidate set of hosts based on a resource-based optimization, including networking resource utilization and networking requirements of the virtual computing instances. Providing a scheduler that is capable of considering multiple resource metrics, including networking metrics, enables more accurate and reliable selection of hosts to reduce processor load, prevent host network saturation, improve cluster resource utilization, and enable more efficient placement of virtual computing instances on hosts in a cluster.

The coarse-grained scheduler performs a coarse-grained, infrastructure-level optimization to select a host for an identified virtual computing instance. This enables the scheduler to provide an improved distribution of load, increase virtual computing instance packing density on hosts, and minimize virtual computing instance rejection by the scheduler.

Aspects of the disclosure also contemplate a fine-grained scheduler that co-locates a pair of communicating virtual computing instances to minimize a distance between the pair of communicating virtual computing instances, such as two or more virtual machines (VMs). A communicating virtual computing instance is a virtual computing instance that is engaging in communications with another virtual computing instance on a same host or communicating with another virtual computing instance on a different host. Virtual computing instances utilize network resources to enable communications between the different virtual computing instances.

In some examples, the pair of VMs are co-located by placing the pair of VMs on the same host or placing the pair of VMs on two different hosts within a same rack of a rack scale architecture (RSA). Reducing the distance between communicating VMs improves communication speed between VMs, reduces network bandwidth usage, and improves network resource efficiency.

While some embodiments are described with reference to VMs for clarity of description, the disclosure is operable with other virtual computing instances. A virtual computing instance is a VM, a container, or any other type of virtualized computing instance. A host supports a VM, a container, and/or any other virtual computing instances. A host may be implemented as a physical server, or as a cloud instance running within a cloud environment. A cloud instance of a host is a host running within a VM, a container, or other virtual computing instances. This may be implemented as a first hypervisor running within a VM, which is running over a second hypervisor, in some examples. A cloud instance of a host runs within a virtual computing instance, while supporting one or more other computing instances. A VM running within a cloud instance of a host may be referred to as a nested VM.

Referring to FIG. 1, an exemplary block diagram illustrates a system for a two-tiered scheduler. The system 100 in this non-limiting example optionally includes a cloud 102. The cloud 102 may be implemented as a private cloud, a public cloud, or a hybrid cloud. A hybrid cloud is a cloud that includes a public cloud and a private cloud. VMware's vCloud Hybrid Services (vCHS) is an example of a hybrid cloud implementation.

The cloud 102 in this example is a cloud computing platform. In some examples, the cloud 102 runs one or more virtual computing instances, such as, but not limited to, VMs in a set of VMs 104. Cloud services associated with the cloud 102 are provided to clients via a network 106. The network 106, in some examples, is a Wide Area Network (WAN) accessible to the public, such as the Internet. The cloud services are provided via one or more physical servers, such as a set of servers 112 associated with data center 110.

In this example, the data center 110 includes one or more physical computing devices in the set of servers 112 and/or data storage device(s) 118. The set of servers 112 may include a single server, as well as two or more servers in a cluster 116. The cluster 116 is a group of two or more physical server devices. In some examples, the cluster 116 is implemented as a VMWare vSphere cluster.

In some examples, the set of servers 112 includes an RSA housing a plurality of physical servers. In yet other examples, the set of servers 112 includes one or more blade servers.

The set of servers 112 in this non-limiting example hosts a set of VMs 114. The set of VMs 114 includes one or more VMs running on one or more servers.

The data storage device(s) 118 in this non-limiting example includes one or more devices for storing data. The data storage device(s) 118 may be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) 118 may include rotational storage, such as a disk. The data storage device(s) 118 may also include non-rotational storage media, such as SSD or flash memory.

In some non-limiting examples, the data storage device(s) 118 provide a shared data store. The shared data store is a data storage accessible by two or more hosts in the cluster 116.

In some examples, the system 100 optionally includes a remote data storage device, such as data storage device 120. The remote data storage device 120 is accessible by the set of servers 112 via the network 106.

The scheduler 108 in this non-limiting example, is a two-tiered, network aware distributed resource scheduler including a coarse-grained scheduler and a fine-grained scheduler. In other examples, the scheduler 108 only includes the coarse-grained scheduler without the fine-grained scheduler. In still other examples, the scheduler 108 includes only a fine-grained scheduler without the coarse-grained scheduler.

The scheduler 108, in this example, runs on one or more computing devices associated with the data center 110, such as a server in the set of servers 112. In other examples, the scheduler 108 optionally executes in the cloud 102.

The set of VMs 114 in the cluster 116 may have highly diverse resource requirements along central processing unit (CPU), memory, and input/output (I/O) dimensions. Prior art schedulers typically handle VM placement and load balancing for CPU, memory, and storage. However, these schedulers typically do not consider either the VMs' or the hosts' networking behavior when performing VM placement or load-balancing. This frequently results in sub-optimal VM placements and relocations causing host network saturation and overloading of network links in core/aggregation level. In contrast, the two-tiered scheduler 108 performs scalable VM placement with multiple resource types and performs VM relocation to relieve resource contention as well as co-locate chatty virtual machines.

Moreover, elastic resource provisioning in a software defined datacenter (SDDC) is frequently managed by a number of different schedulers managing different resources independently of one another. For example, some systems computer resources, such as CPU and memory, are managed by a resource scheduler, storage resources are managed by a storage scheduler, and network resources are managed by a network scheduler. These different schedulers operate independently from each other and frequently work on different sets of input metrics. The utilization of these disparate schedulers also results in sub-optimal VM placements and inefficient resource management in the datacenter.

A distributed resource scheduler (DRS) is a prior art scheduler for managing resources in a cluster, such as CPU, memory and storage. In some examples, the primary metric the scheduler optimizes is dynamic entitlement. This metric reflects resource delivery in accordance with both the needs and importance of the VMs and is a function of the VMs actual resource demands, overall cluster capacity, and the VMs resource settings. The VMs resource settings may include reservations, limits, and shares. A reservation is a claim or guarantee on a specific amount of a resource should the VM demand it. A VMs entitlement for a resource is higher than its reservation and lower than its limit. Dynamic entitlement is equal to VM demand if there are sufficient resources in the cluster to meet all VM demands. Otherwise, it is scaled down based on cluster capacity, the demands of other VMs, and its settings for reservations, shares, and limits.

A DRS scheduler typically computes host load (its normalized entitlement) by summing up the entitlements of the VMs running in it and normalizing it using the hosts capacity. This normalized entitlement is then used to calculate the cluster balance metric, which is the standard deviation of the normalized entitlements of hosts. The primary target of the optimization algorithm is to move the standard deviation value close to zero when making placement decisions or load-balancing.

However, the DRS scheduler does not fully factor in networking resources when making VM-placement decisions. Support for reservations on a VM's outbound bandwidth, such as transmit bandwidth, allows DRS to perform an admission control check to ensure that the sum of network reservations on a host do not exceed its capacity. However, DRS does not consider actual usage of a host's network interface controllers (NICs).

In contrast with these prior art schedulers, the scheduler 108 in the present disclosure manages compute, storage, memory, and network resources together. The scheduler does not consider network resource usage independently from CPU usage. Even with support for hardware offloading, processor cycles are needed to drive traffic. The positive correlation between compute and networking places networking as a secondary, dependent resource rather than a primary, independent resource.

Networking resources have on-host and off-host components. The on host components may include physical network interface controller (NIC). The off-host components include switch and rack.

Figure 2:
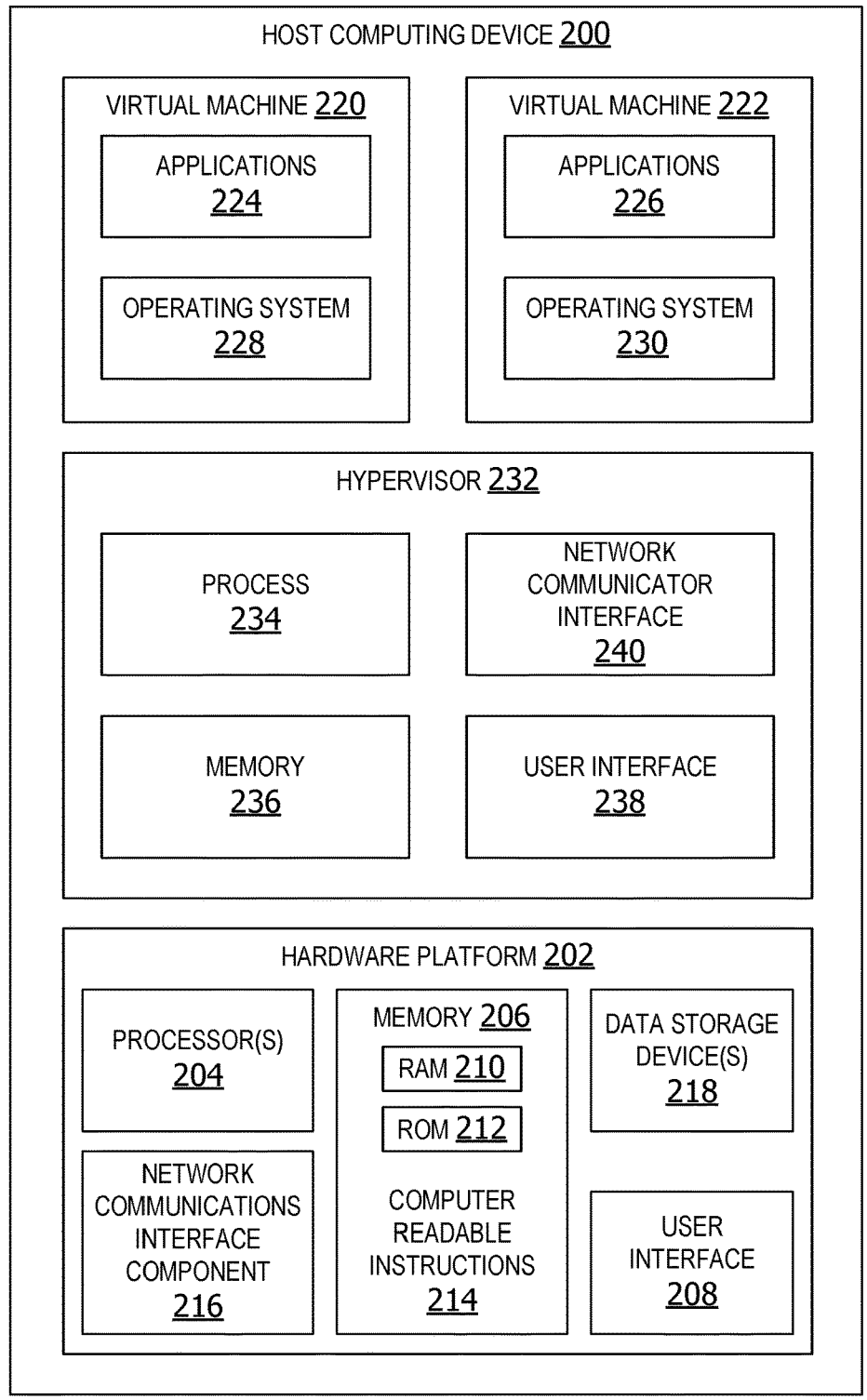
FIG. 2 is an exemplary block diagram illustrating a host computing device.

FIG. 2 is a block diagram of a host computing device for serving one or more VMs. The illustrated host computing device 200 may be implemented as any type of host computing device, such as a server. In some non-limiting examples, the host computing device 200 is implemented as a host or ESXi host from VMware, Inc. The host computing device 200 is a host for running one or more VMs.

The host computing device 200 represents any device executing instructions (e.g., as application(s), operating system, operating system functionality, or both) to implement the operations and functionality associated with the host computing device 200. The host computing device 200 may include desktop personal computers, kiosks, tabletop devices, industrial control devices, or server, such as, but not limited to, a server in the set of servers 112 in FIG. 1. In some examples, the host computing device 200 is implemented as a blade server within a RSA. Additionally, the host computing device 200 may represent a group of processing units or other computing devices.

The host computing device 200 includes a hardware platform 202. The hardware platform 202, in some examples, includes one or more processor(s) 204, a memory 206, and at least one user interface, such as user interface component 208.

The processor(s) 204 includes any quantity of processing units, and is programmed to execute computer-executable instructions for implementing the examples. The instructions may be performed by the processor or by multiple processors within the host computing device 200, or performed by a processor external to the host computing device 200. In some examples, the one or more processors are programmed to execute instructions such as those illustrated in the figures (e.g., FIG. 6, FIG. 7, and FIG. 8).

The host computing device 200 further has one or more computer readable media, such as the memory 206. The memory 206 includes any quantity of media associated with or accessible by the host computing device 200. The memory 206 may be internal to the host computing device 200, external to the host computing device, or both. In some examples, the memory 206 includes read-only memory (ROM) 210.

The memory 206 further stores a random access memory (RAM) 210. The RAM 210 may be any type of random access memory. In this example, the RAM 210 is part of a shared memory architecture. In some examples, the RAM 210 may optionally include one or more cache(s). The memory 206 further stores one or more computer-executable instructions 214.

The host computing device 200 may optionally include a user interface 208 component. In some examples, the user interface 208 includes a graphics card for displaying data to the user and receiving data from the user. The user interface 208 may also include computer-executable instructions (e.g., a driver) for operating the graphics card. Further, the user interface 208 may include a display (e.g., a touch screen displays or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor.

In some examples, the hardware platform 202 optionally includes a network communications interface component 216. The network communications interface component 216 includes a network interface card and/or computer-executable instructions (e.g., a driver) for operating the network interface card. Communication between the host computing device 200 and other devices may occur using any protocol or mechanism over any wired or wireless connection. In some examples, the communications interface is operable with short range communication technologies such as by using near-field communication (NFC) tags.

The data storage device(s) 218 may be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) 218 may include rotational storage, such as a disk. The data storage device(s) 218 may also include non-rotational storage media, such as SSD or flash memory.

In some non-limiting examples, the data storage device(s) 218 provide a shared data store. A shared data store is a data storage accessible by two or more hosts in a host cluster.

The host computing device 200 hosts one or more virtual computing instances, such as, but not limited to, VMs 220 and 222. The VM 220 in some examples, includes data such as, but not limited to, one or more application(s) 224. The VM 222 in this example includes applications(s) 226. The application(s), when executed by the processor(s) 204, operate to perform functionality on the host computing device 200.

Exemplary application(s) include, without limitation, mail application programs, web browsers, calendar application programs, address book application programs, messaging programs, media applications, location-based services, search programs, and the like. The application(s) may communicate with counterpart applications or services such as web services accessible via a network. For example, the applications may represent downloaded client-side applications that correspond to server-side services executing in a cloud.

In some examples, modern enterprise applications run in datacenter environments are distributed in nature and usually I/O intensive. Each component of such distributed applications are packed into individual VMs and deployed in clusters of physical machines, such as, but not limited to, VMware vSphere clusters. In these examples, each component has different resource demands. Each of the VMs running a component of a distributed application may also have highly diverse resource requirements. The two-tiered scheduler 132 shown in FIG. 1 in some examples, performs an infrastructure optimization such that the application(s) running inside one or more VMs is allotted the necessary resources to run.

In this example, each VM includes a guest operating system (OS). In this example, VM 220 includes guest operating system (OS) 228 and VM 222 includes guest OS 230.

The host computing device 200 further includes one or more computer executable components. Exemplary components include a hypervisor 232. The hypervisor 232 is a VM monitor that creates and runs one or more VMs, such as, but without limitation, VM 220 or VM 222. In one example, the hypervisor 232 is implemented as a vSphere Hypervisor from VMware, Inc.

The host computing device 200 running the hypervisor 232 is a host machine. VM 220 is a guest machine. The hypervisor 232 presents the OS 228 of the VM 220 with a virtual hardware platform. The virtual hardware platform may include, without limitation, virtualized processor 234, memory 236, user interface device 238, and network communication interface 240. The virtual hardware platform, VM(s) and the hypervisor are illustrated and described in more detail in FIG. 16 below.

Figure 3:
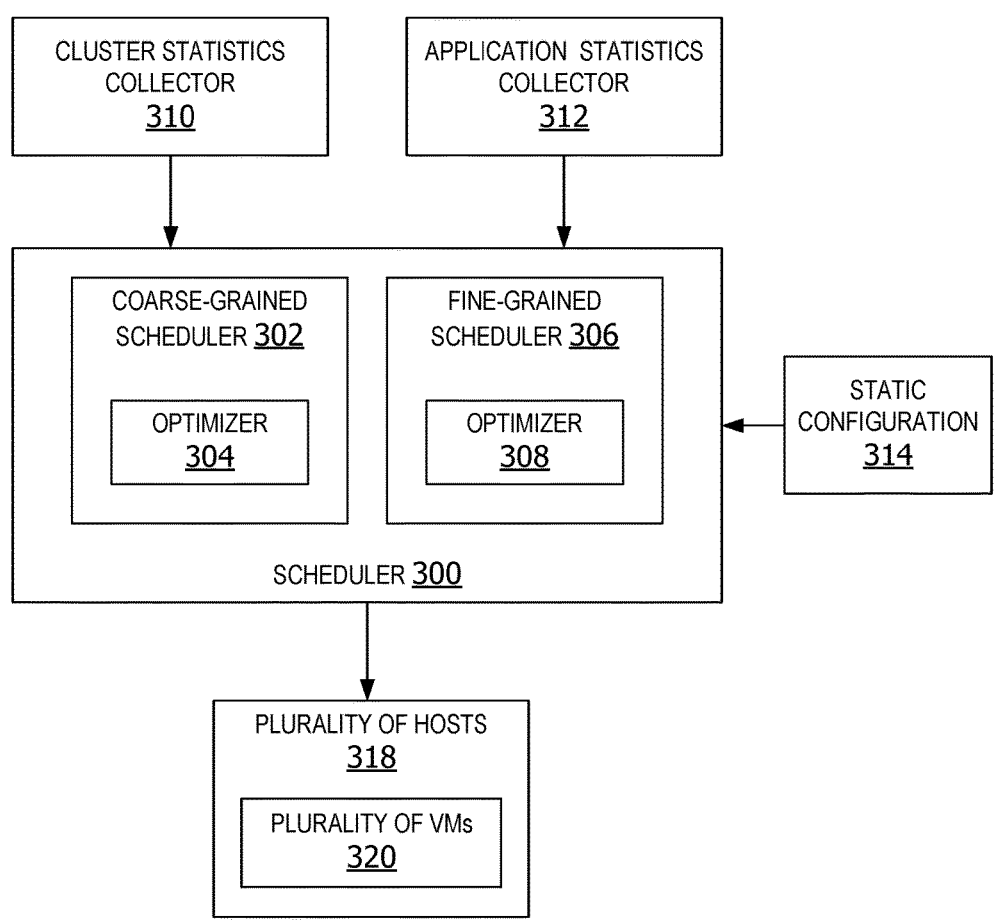
FIG. 3 is an exemplary block diagram illustrating a two-tiered scheduler.

FIG. 3 is an exemplary block diagram illustrating a two-tiered scheduler. The scheduler 300 in this example is a two-tiered scheduler for placing virtual machines on hosts and relocating VMs to remediate resource contention as well as improve application metrics.

In this example, the scheduler 300 includes a coarse-grained scheduler 302 and a fine-grained scheduler 306. The coarse-grained scheduler 302 finds a suitable host for an incoming or distressed virtual computing instance to optimize for infrastructure.

The scheduler 302, in some examples, selects a host for a powering-on VM such that it can optimize for the demands of both infrastructure provider and the infrastructure user. The coarse-grained scheduler 302 in some examples includes a resource based optimizer 304. In this example, the optimizer 440 includes a sampling based packing algorithm for performing a coarse-grained, resource-based optimization on a candidate set of hosts. The sampling based packing algorithm is implanted to find a host for a VM from a sample of hosts based on one or more resource metrics for optimization.

The scheduler 300 collects statistics from a cluster statistics collector 310. The cluster statistics received from the cluster statistics collector 310 includes host resource capacity, VM resource demand, and VM resource usage. The host resource capacity data includes, without limitation, total CPU utilization, total consumed memory, and total network receive and transmit usage. The cluster statistics collector 310 in some examples, provides per-VM usage statistics, such as the VM resource demand and VM resource usage, to the scheduler.

Network traffic between hosts and VMs in a cluster is unstable. The network traffic frequently includes periods of high usage followed by low usage. Due to the peaks and valleys in network traffic, averaging network traffic usage for a VM or host is not always useful. Therefore, the VM network resource usage statistics may be provided using a percentile measure. In these examples, a percent high-water mark may be used for stability in determining network usage. In one non-limiting example, the percent high-water mark is the seventy-fifth percentile. In other examples, a high-water mark of the eightieth percentile may be utilized.

Moreover, in some examples, the cluster statistics include internal send and receive traffic occurring on a single host, as well as external send and receive traffic occurring across different hosts. The external network traffic is more expensive than the internal network traffic. These internal versus external communications traffic statistics are considered to avoid separating VMs which communicate at a high rate with one another on the same host.

The scheduler retrieves the statistics from the cluster statistics collector 310 to evaluate the cluster status as the VMs are powering-on. The scheduler 300 also receives basic topology information, rack boundary data, and link bandwidth data from the static configuration component 314.

In this example, the coarse-grained scheduler 304 finds a host for a powering-on or already running but resource-wise distressed VM. When finding such a host, there are many metrics that the scheduler can optimize. In some examples, the coarse-grained scheduler optimizes for higher packing density, minimal incoming VM rejections, speed of locating a suitable host, or load-balancing.

In some examples, the optimizer 304 performs a dot product algorithm on a candidate set of hosts to select the best host for placement of a particular VM. The optimizer 304 selects a host which fits the particular VM by defining alignment of a task relative to a machine across multiple dimensions. The dimensions are different resources. In the simplest case, where there is only one dimension, such as but not limited to a CPU resource, the optimizer 304 picks the largest task that fits a given host.

Extending the optimization to multiple dimensions, the larger the alignment, the lower the fragmentation of the resources. The coarse-grained scheduler 302 picks the best available host such that the VM's resource demand vector and the host's available resource vector is aligned. The dot product between the VM's resource demand vector and the host's available resource vector gives the best packing efficiency for the cluster.

VM scheduling places the identified VM on the selected host in a plurality of hosts 318 in the cluster. The plurality of hosts 318 includes a plurality of VMs 320 running on one or more of the hosts. The plurality of hosts 318 may be implemented as physical host computing devices. In other examples, a host in the plurality of hosts 318 is implemented as a hypervisor running one or more VMs.

The fine-grained scheduler 306 optimizes for inter-VM communications. The fine-grained scheduler 306 includes an optimizer 308 for performing a fine-grained optimization on a set of communicating VMs. The fine-grained optimization permits the scheduler to place VMs closer based on communication patterns between VM. This enables optimization of VMs that communicate at a higher rate with one or more other VMs.

During the fine-grained optimization, the scheduler 306 relocates a VM from one host in the cluster to another host in the cluster to optimize for application demands. This may be accomplished, in some examples, by co-locating two or more communicating VMs. Co-locating the VMs refers to moving the communicating VMs closer together within the cluster to minimize the distance between VMs. In some examples, a pair of VMs are co-located by placing the pair of VMs on the same host. In other examples, a pair of VMs are co-located by placing the VMs on different hosts within the same rack.

The application statistics collector 312 collects VM data associated with communications between the VMs. The applications statistics collector 312 provides this data to the scheduler as a set of communication graphs. The set of communication graphs includes one or more VM-to-VM communication graphs. In some examples, a communication graph provides data regarding communications between two VMs.

In some examples, the application statistics collector 312 generates the communications graphs based on Internet Protocol Flow Information Export (IPFIX) records obtained from virtual switches running inside each host. These records are collected periodically, at regular intervals. In one example, the records are collected at every one-minute interval. These records are collected by an IPFIX collector service and then summarized into one or more communication graphs for the use of the fine-grained scheduler. In some examples, the scheduler analyzes the set of communication graphs to identify one or more VMs for optimization.

In other examples, the IPFIX collector service does not provide records of each and every VM-VM communication activity to the scheduler. In cases involving large numbers of VMs, the amount of inter-VM communications data may be prohibitively large. In such cases, the IPFIX collector service provides the communications records for the top VM candidates to be co-located based on inter-VM communications by the fine-grained scheduler. This minimizes the amount of VM communications data provided to the scheduler 300.

The optimizer 308 includes a penalty-based VM co-location algorithm to co-locate communicating VMs based on a penalty score. The penalty scores are generated by a penalty function based on communication patterns between the VMs. In some examples, the penalty function analyzes communication graphs between VMs to determine the penalty score for each VM being analyzed.

The penalty score indicates whether a VM communicates with one or more other VMs at a relatively higher rate or across a greater distance than other VMs in the cluster.

The penalty score in some examples indicates a distance between two or more communicating VMs. In some examples, the penalty score is proportional to the rate a pair of VMs are communicating. In still other examples, the penalty score is proportional to the rate at which a pair of VMs are communicating as well as the distance between the two VMs in the pair.

If the VMs are in the same host, the pair of VMs have a very low distance. The distance increases when the communications cross host boundaries within a rack. The distance increases again when the communications between VMs cross rack boundaries. Thus, VMs communicating across rack boundaries have a higher penalty score than a pair of VMs communicating across host boundaries within the same rack. Likewise, a penalty score for a pair of VMs communicating between different hosts is greater than the penalty score for communicating VMs on the same host.

In one non-limiting example, a first pair of VMs located far apart may have a lower penalty score than a second pair of VMs located a little closer together if the first pair of VMs communicate infrequently, while the second pair of VMs communicate more frequently. In such a case, the penalty scores are lowered moving the second pair of VMs closer together rather than moving the first pair of VMs.

Co-locating communicating VMs in some examples is a large system optimization. The fine-grained scheduler optimizes the overall VM-to-VM traffic matrix. However, when performing a full system optimization, optimization may require a non-trivial amount of time and resources due to the large problem size of the VM-to-VM matrix optimization.

Moreover, the fine-grained optimizer in some examples works on a past snapshot of traffic matrix. The fine-grained scheduler in such cases cannot converge to a final solution because the traffic matrix may change before an optimal solution is calculated. Moreover, a longer migration time makes convergence more difficult to achieve.

Therefore, in some examples, the fine-grained scheduler does not optimize the entire system in one run. Instead, the fine-grained scheduler works in a greedy fashion where it optimizes a small fraction of the traffic matrix in a given pass, such as in a candidate set of hosts or a candidate set of VMs. The fine-grained scheduler co-locates VMs in multiple passes such that the VM placement is at approximate optimal state following two or more rounds of fine-grained optimization on two or more sets of VMs.

Alternatively, or in addition, the fine-grained scheduler is opportunistic. The scheduler in these examples only moves a communicating VM if there are sufficient resources available on the target host. The scheduler runs the dot product algorithm on the candidate set of hosts in the communication domain and picks the best available host.

In other examples, the fine-grained scheduler performs a cost-benefit analysis prior to migrating a VM to a different host. The cost-benefit analysis is performed to determine migration costs associated with moving the VM from the current host to a different host.

Figure 4:
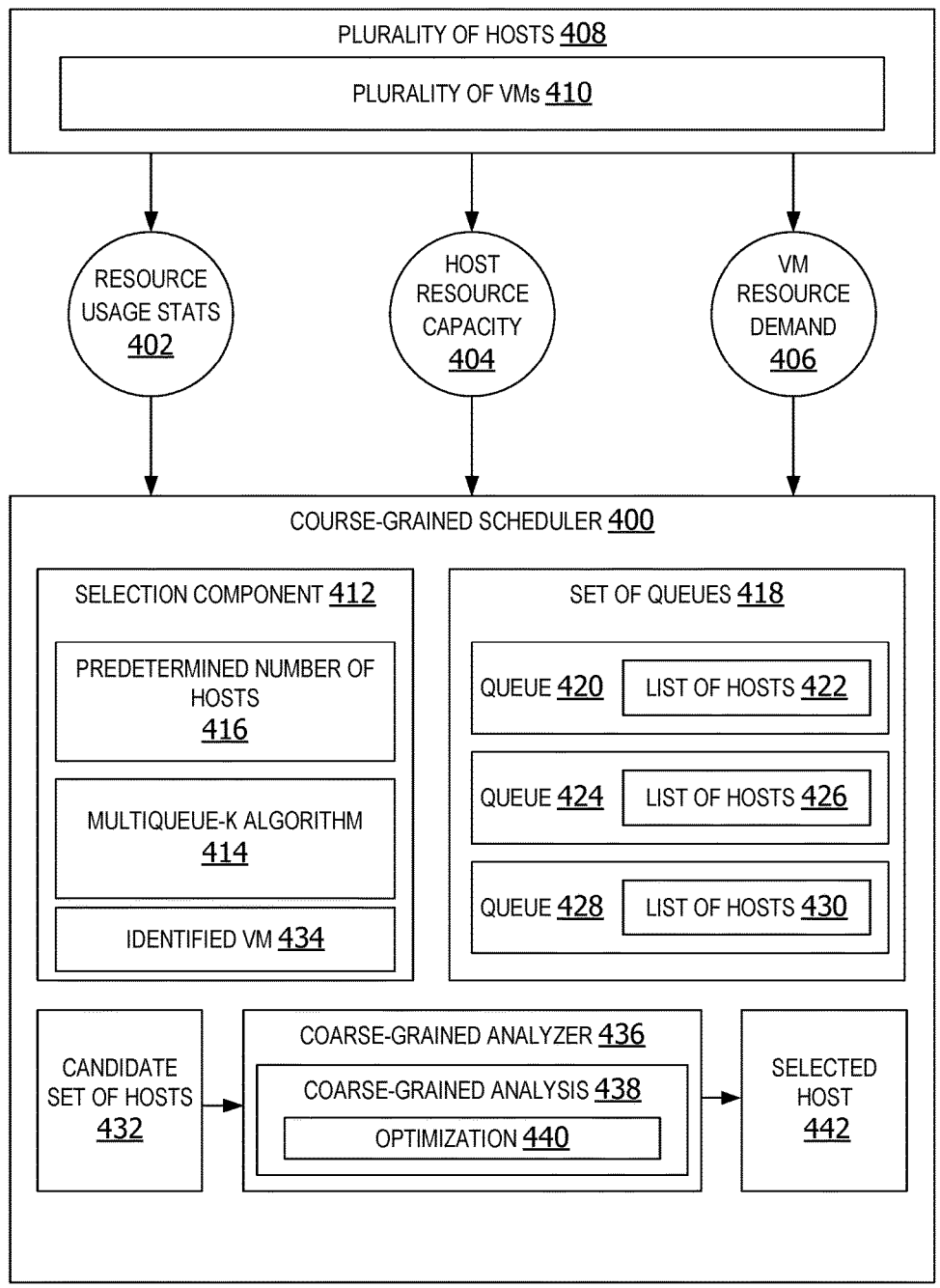
FIG. 4 is an exemplary block diagram illustrating a coarse-grained scheduler.

FIG. 4 is an exemplary block diagram illustrating a coarse-grained scheduler. The coarse-grained scheduler 400 selects a host for a new virtual computing instance or a migrating virtual computing instance.

In this non-limiting example, the coarse-grained scheduler 400 selects a host for a powering-on VM or migrating a VM from one host to another host. The coarse-grained scheduler 400 receives resource statistics. The resource statistics include resource usage statistics 402, host resource capacity 404, and VM resource demands 406 for a plurality of hosts 408, a plurality of VMs 410 being hosted on the plurality of hosts 408, and/or an identified VM 434 to be placed on a host. An identified VM 434 may include a new powering-on VM or a VM to be relocated from one host to another host.

VM's have few resource shapes or resource skews. For a given VM, it requires either a high memory, high CPU, high networking, or a combination of these. For example, a VM may utilize a combination of a high networking and a high CPU due to the positive correlation of networking workload and CPU cycles consumes. Therefore, not all combinations are practical.

Moreover, in trace based experiments, utilization of the dot product algorithm by coarse-based schedulers resulted in best results both in packing quality and balance in the cluster. However, dot product requires traversing all the available hosts and calculating the dot product in order to select a host which has the resource vector that best aligns with the VM's resource demand vector. This does not scale well with cluster size.

In some examples, a coarse-grained analyzer 436 performs a coarse-grained analysis 438 on a candidate set of hosts 432. The coarse-grained analysis includes running the dot product algorithm on the selected candidate set of hosts to select the best host for a particular VM based on optimizing one or more resources in the cluster. In this manner, the runtime of the scheduler is constant to find a location of the VM. Moreover, performing the dot product analysis on a sample of hosts picked from the cluster minimizes the pool of hosts that the dot product algorithm uses to select a best available host for the VM. This minimizes the pool of hosts that the dot product algorithm uses to find the best available host.

The candidate set of hosts is selected by a selection component 412 in some examples. As discussed above, both VMs and hosts have resource utilization shapes. The VMs' resource demand vectors and the hosts' available resources vectors have distinct shapes. The hosts in the cluster are organized into a set of queues 418 based on these resource shapes.

The set of queues 418 is a set of priority queues including an ordered list of hosts from the plurality of hosts. The set of queues 418 includes two or more queues providing an ordered list of hosts based on the resource shapes of the hosts.

In one non-limiting example, the set of queues provides ordered lists of hosts based on resource shapes for CPU and memory resources. In this example, the set of queues 418 include three queues: a CPU queue 420, a memory queue 424, and a CPU+memory queue 428. The CPU+memory queue is a queue for a combination of resources.

In another example, the set of queues may include seven queues for CPU, network, and memory resources. In this example, the set of queues includes a CPU queue, a network queue, a memory queue, a CPU+memory queue, a CPU+network queue, a network+memory queue, and a CPU+memory+network queue.

In yet another example, the queues may include queues for CPU and network resources. In this example, the set of queues includes a CPU queue, a network queue, and a CPU+network queue.

In some examples, the hosts are listed in accordance with availability of the one or more resources. For example, queue 420 may include a list of hosts 422 ordered in accordance with CPU resources associated with each host in the list. A host having the greatest CPU resource capacity is listed higher or with greater priority in the list than a host with less CPU resource capacity. Likewise, queue 424 may include a list of hosts 426 ordered in accordance with network resources available on each host. Queue 428 includes an ordered list of hosts 430 ordered in accordance with CPU and network resources.

In other examples, hosts are listed in accordance with resource availability and a number of VMs on a host. For example, hosts may be listed in queues in accordance with a number of VMs on the hosts. A host with no VMs running on the host are listed with a higher priority than a VM with one or more VMs. In this example, the hosts with no VMs or hosts with only a single VM are selected out of each queue before hosts with two or more VMs having a same or similar resource availability.

In other examples, hosts are listed in accordance with resource availability and a distance between hosts. For example, hosts located on a particular rack or hosts on a same rack may be listed in a higher priority than hosts in different racks having a same or similar resource availability.

Hosts are added to each queue in the set of queues during initialization of the set of queues 418. When the cluster is initialized, the cluster manager calls the initialization code of the scheduler to build the priority queues.

In some examples, each host in the plurality of hosts is assigned to at least one queue. In this example, each host in the plurality of hosts is placed into at least one queue in the plurality of queues in an order corresponding to at least one resource associated with each host.

During the VM placement phase, the selection component 412 selects a predetermined number "K" of hosts 416 from each queue based on a multiqueue-K algorithm 414. The pre-determined number of hosts 416 is a fixed number of hosts taken from each queue. In a non-limiting example, if the predetermined number of hosts 416 is three (3), the selection component 412 selects three hosts from queue 420, three hosts from queue 424, and three hosts from queue 428 for a candidate set of hosts 432 that includes nine (9) hosts. In operation, the multiqueue-K algorithm 414 selects the hosts from each queue, where "K" is the number of hosts the coarse-grained scheduler 400 pops from each priority queue in the set of queues 418 for one VM placement optimization.

In some examples, the predetermined number of hosts "K" is a user-configurable number of hosts. The higher the "K" value, the more accurate the host sampling. However, as the "K" value increases, the overhead costs also increase. The overhead costs refer to resource utilization for selecting a host, such as processor utilization, etc. Thus, the "K" value controls the expense of the search for a host.

In some example, the predetermined number of hosts is selected by an administrator. In other examples, the predetermined number of hosts is a default value. In other examples, the predetermined number of hosts is determined based on time of day, day of the week, peek workload periods, or other factors. For example, during a peek workload period, the predetermined number of hosts may be a smaller number of hosts while a larger number of hosts is selected during off-peak hours, or vice-versa. Likewise, a different predetermined number of hosts may be selected on workdays than on weekends or holidays.

The number of queues grows exponentially with the number of resource types considered for placement. However, in some examples, utilizing two to four resource types is sufficient for resource-based optimization of placement decisions. Moreover, some queues may be eliminated from the set of queues by analyzing VM resource shapes used in one or more datacenters.

The coarse-grained scheduler analyzes the candidate set of hosts to identify a host for a particular VM. In some examples, the analysis of the candidate set of hosts includes performing a dot product algorithm on the candidate set of hosts.

The dot product analysis is only performed with regard to hosts in the candidate set of hosts rather than analyzing all hosts in the cluster. Because this is not an exhaustive search, the selection process is more efficient.

The VM is placed on the selected host. The list of hosts in the set of hosts 418 is updated to reflect changes in host resource capacity of the selected host 442 due to the placement of the identified VM onto the selected host. The set of queues may be updated on detection of a change to a resource capacity of a host. In other words, the set of queues may be updated when a powering-on VM is placed on a host or when a VM is migrated from one host to another host.

When a powering-on VM is placed on a selected host, the selected hosts priority listing in a queue is updated to reflect the changes in the host's reduced resource availability. When a VM is migrated off a first host and onto a second host, the set of queues are updated to reflect the resources released on the first host and the resources of the second host taken up by the VM as a result of the VM relocation.

In other examples, the set of queues 418 are updated periodically upon occurrence of an update time interval. The update time interval may be a default amount of time, a user-defined amount of time, or any other time interval. This enables updates of the set of queues at regular intervals. Updating a queue in the set of queues 418, in some examples, has a cost of log h steps, where "h" is the number of hosts in the cluster.

In still other examples, after placing a VM on a selected host, the coarse-grained scheduler 400 updates the host resource capacity 404 for the selected host. The resource capacity for the selected host is updated to indicate resources consumed by the identified VM, such as, but not limited to, the CPU, memory, networking, and/or storage resources consumed by the identified VM placed on the selected host. This may be accomplished by updating host available resource vectors to deduct resources reserved or allocated to the identified VM.

Figure 5:
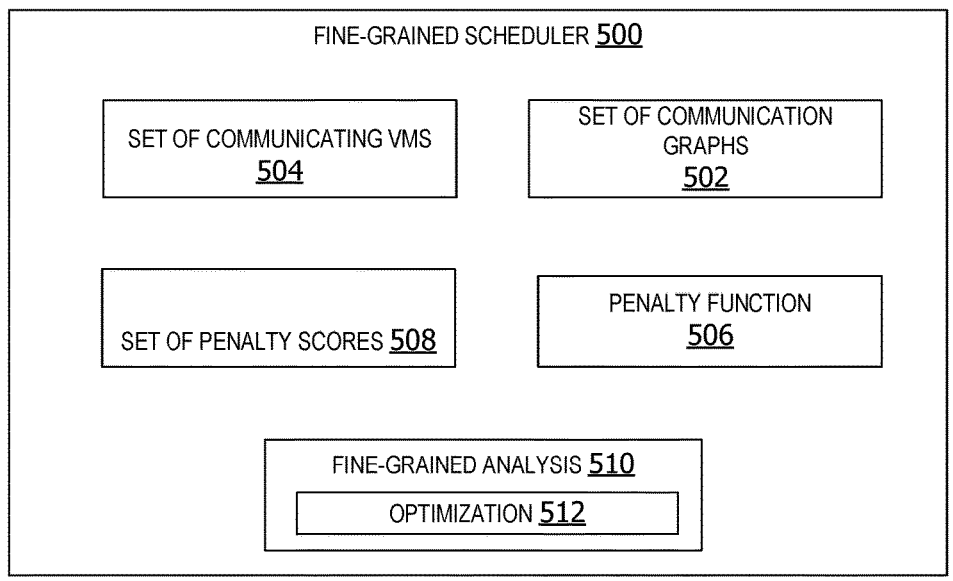
FIG. 5 is an exemplary block diagram illustrating a fine-grained scheduler.

FIG. 5 is an exemplary block diagram illustrating a fine-grained scheduler. The goal of the fine-grained scheduler 500 is to optimize for communications between virtual computing instances. More specifically, in this example, the fine-grained scheduler 500 optimizes communications between VMs (inter-VM) communications.

In this non-limiting example, the fine-grained scheduler performs a penalty-based optimization in which a penalty score for a set of two or more communicating VMs 504 is reduced by migrating one or more of the VMs to a different host to co-locate the VMs. Co-locating the VMs minimizes the communications distance between the VMs.

The fine-grained scheduler 500 in this example, receives a set of communication graphs 502 associated with a plurality of VMs. The set of communication graphs 502 includes one or more communication graphs associated with two or more communicating VMs. A penalty function 506 is utilized to analyze the set of communication graphs 502 to generate a set of penalty scores for the plurality of VMs.

The fine-grained analysis 510 analyzes the set of penalty scores 506 to identify the set of communicating VMs 504 from the plurality of VMs for optimization. In some examples, the set of communicating VMs are the VMs with the highest penalty score(s). These VMs are the top network traffic utilizers.

In other examples, the set of communicating VMs are VMs having a penalty score that exceed a threshold penalty score. In this example, a penalty score for each pair of VMs is compared to the threshold score to determine whether to co-locate the pair of VMs.

In other examples, the set of communicating VMs 504 includes VMs having a higher priority than other VMs in the plurality of VMs. In these examples, VMs with lower penalty scores are optimized prior to VMs with higher penalty scores if the lower penalty score VMs have a higher priority than the other VMs. For example, VMs associated with an application may be co-located prior to VMs running other lower priority applications.

In still other examples, the set of communicating VMs 504 includes two or more VMs having the same group tag. The VMs with the same group tag in this example are co-located together.

In some examples, the penalty function 506 is utilized to analyze communication graphs for a candidate set of VMs or VMs located on a candidate set of hosts. The optimizer 512 utilizes the penalty scores generated based on the communication graphs to select a set of communicating VMs 504 for co-location.

In some examples, the set of communicating VMs 504 includes a single pair of communicating VMs, such as VM1 and VM2 having one penalty score for the pair of VMs. In another example, the set of communicating VMs may include three VMs, such as a first pair of VMs (VM1 and VM2) having a first penalty score and a second pair of VMs (VM2 and VM3) having a second penalty score. In yet another example, the set of communicating VMs may include four VMs, such as a first pair of VMs (VM1 and VM2) having a first penalty score and a second pair of VMs (VM3 and VM4) having a second penalty score.

The fine-grained scheduler 500 may attempt to co-locate two or more communicating VMs in closer proximity to one another. This may be accomplished by placing the communicating VMs onto the same host. From a pure communication point of view, it is desirable for the fine-grained scheduler 500 to co-locate all VMs which are communicating with each other to a single host. However, the fine-grained scheduler may not be able to fit all the communicating VMs in a single application to a single host. Moreover, if all communicating VMs associated with a given application are placed on the same host, it limits the failure domain of the application to a single host.

In other examples, the fine-grained scheduler 500 attempts to co-locate communicating VMs to a single rack. However, co-locating all communicating VMs to the same rack results in inter-host VM traffic going through the hypervisor networking stack. However, the traffic stays within the same top of the rack switch which has higher capacity than the inter-rack links. Also, because racks have many hosts, in some examples, it is easier for a fine-grained scheduler 500 to find available spaces or holes to fit all the VMs in the communicating group.

The fine-grained scheduler 500 attempts to co-locate the VMs to the same host or the same rack using a penalty function 506. The penalty function 506 analyzes communication graphs in the set of communication graphs 502 to generate a set of penalty scores 508. The set of penalty scores 508 includes one or more penalty scores.

The fine-grained scheduler 500 minimizes the penalty score associated with a given set of communicating VMs by performing migrations of one or more of the VMs. The fine-grained analyzer 504 migrates at least one VM in the set of communicating VMs to a different host to minimize the distance between two or more of the communicating VMs and/or reduce at least one penalty score.

The penalty score in some examples is reduced by performing a single VM migration. For example, a first VM on a first host communicating with a second VM on a second host may be moved from the first host to the second host to achieve optimization. The penalty score is reduced in other examples by performing two or more VM migrations. For example, the first VM may be moved from the first host to a third host and the second host may be moved from a second host to the third host to co-locate the first and second VMs on the same host.

Thus, the two-tiered scheduler, including the coarse-grained scheduler and the fine-grained scheduler, is invoked in some examples when a new VM is powered on in the cluster or when a VM is or moved into the cluster. For example, when a VM is powered on, the scheduler is invoked to locate the host for the VM. The priority queues are already built up by the initialization code. The scheduler pops the predetermined number "K" of hosts from each queue to create a candidate set of hosts. The scheduler finds the best host in the candidate set of hosts based on the dot product. The scheduler updates the queues to indicate the VM placement.

In other examples, the two-tiered scheduler is invoked periodically for remediation of resource-wise distressed VMs and co-location of communicating VMs. For example, when the scheduler is invoked periodically, it identifies a set of top distressed VMs in the cluster based on the penalty scores for the VMs. The scheduler performs the multi-queue-K algorithm to find a suitable host for each of the VMs in the set of VMs. The scheduler attempts to co-locate one or more of the communicating VMs by invoking the fine-grained optimizer. The scheduler queries one or more IPFIX based communication graph(s) to identify top communicating VMs and apply the penalty function for these VMs to generate penalty scores. Based on the penalty scores and a migration budget the scheduler is allowed, the scheduler picks top candidates for the co-location.

In other examples, upon completion of the co-location, the scheduler marks the VMs which are communicating with each other with a tag to indicate that the VM belongs to a communication group. The tag is placed on the communicating VMs so that during the next scheduler optimization passes, the tagged VMs have less chance of getting migrated for other reasons, such as for remediation of over-utilized host. During the first phase of the remediation/load-balancing pass, when moving a distressed VM to a different host, the scheduler avoids moving the VMs with a group tag.

In some examples, VMs without a group tag are moved preferentially over VMs with a group tag. In other examples, VMs with a group tag are not moved. In still other examples, VMs with a group tag are moved simultaneously with one or more VMs having the same group tag to the same host or the same rack. In yet other examples, a VM with a group tag is only moved to a host that will place the VM into closer proximity to one or more other VMs with the same group tag.

Figure 6:
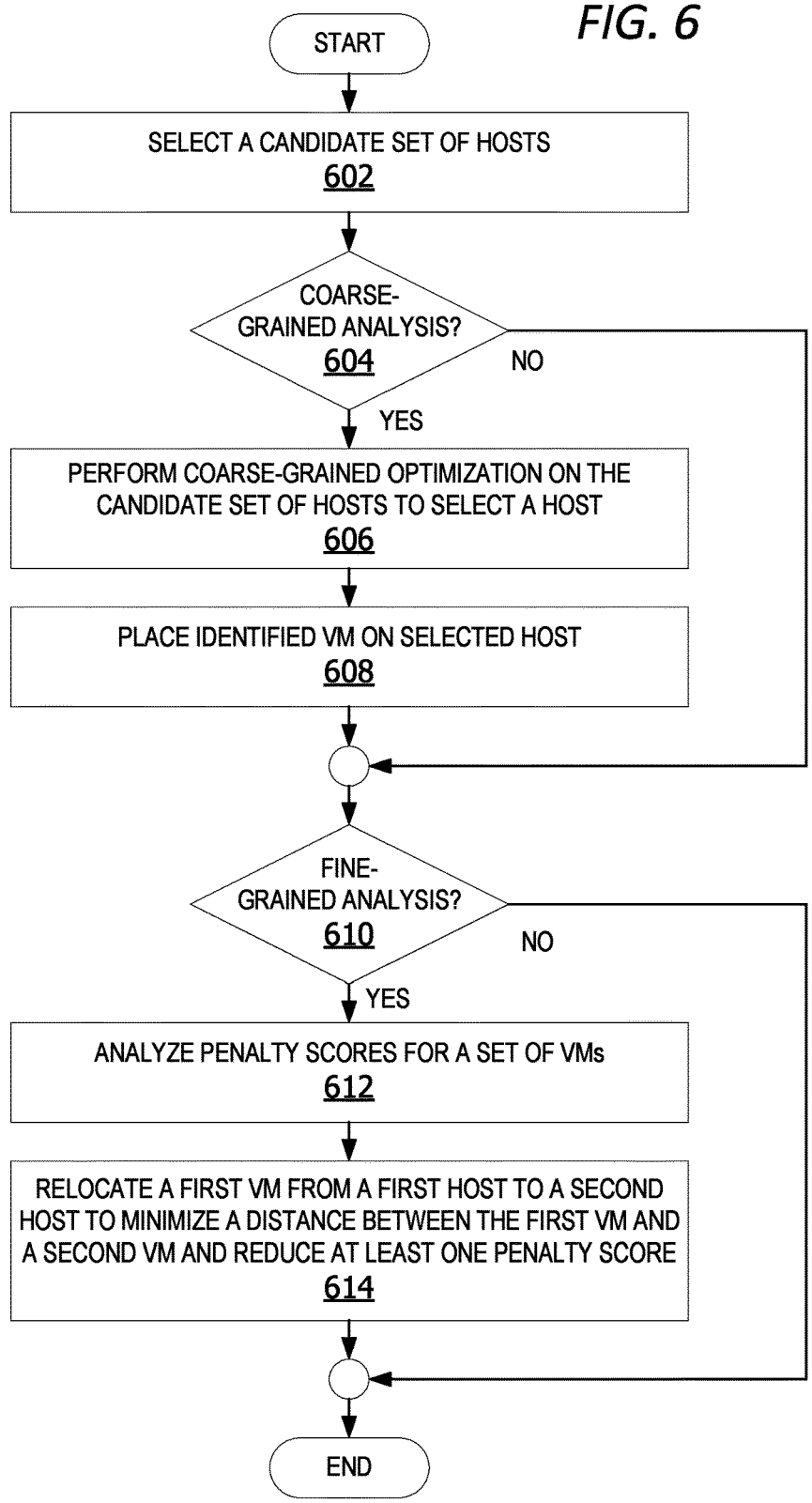
FIG. 6 is an exemplary flow chart illustrating operation of a two-tiered scheduler.

FIG. 6 is an exemplary flow chart illustrating operation of a two-tiered scheduler. The process shown in FIG. 6 may be performed by a scheduler executed by a computing device, such as, but not limited to, the scheduler 132 in FIG. 1 or scheduler 300 in FIG. 3. The computing device may be implemented as a computing device, such as but is not limited to, a server in set of servers 124 in FIG. 1, host computing device 200 in FIG. 2, host computing device 1500, or host computing device 1600 in FIG. 16. Further, execution of the operations illustrated in FIG. 6 is not limited to a scheduler. One or more computer-readable storage media storing computer-readable instructions may execute to cause at least one processor to implement the operations illustrated in FIG. 6.

A candidate set of hosts is selected at 602. A determination is made as to whether to perform a coarse-grained analysis at 604. If yes, a coarse-grained, resource-based optimization is performed on a candidate set of hosts to select a host at 606. An identified VM is placed on the selected host at 608.

A determination is made as to whether to perform a fine-grained optimization at 610. If no, the process terminates thereafter. If yes, penalty scores for a set of VMs are analyzed at 612. A first VM in the set of VMs is relocated from a first host to a second host to minimize a distance between the first VM and a second VM based on the penalty scores analysis to co-locate the VMs. Co-locating the first VM and the second VM reduces at least one penalty score at 616. The process terminates thereafter.

The process in FIG. 6 is described as being implemented to perform scheduling of VMs. However, in other examples, the process is implemented for scheduling with regard to containers.

While the operations illustrated in FIG. 6 are described as being performed by a host computing device or a server, aspects of the disclosure contemplate that performance of the operations by other entities. For example, a cloud service associated with a cloud, such as cloud 102 in FIG. 1, may perform one or more of the operations.

Figure 7:
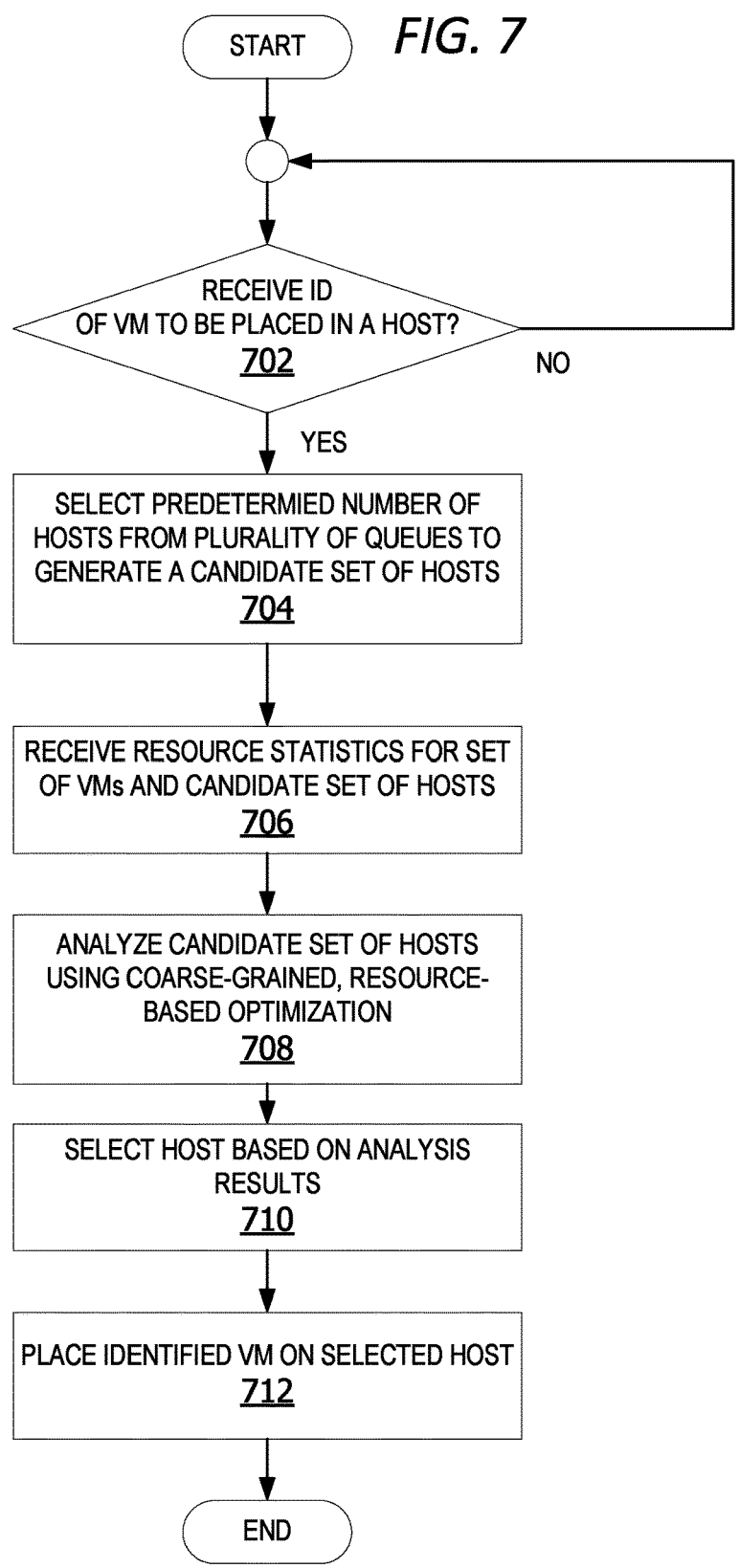
FIG. 7 is an exemplary flow chart illustrating operation of a coarse-grained scheduler.

FIG. 7 is an exemplary flow chart illustrating operation of a coarse-grained scheduler. The process shown in FIG. 7 may be performed by a scheduler on a computing device, such as, but not limited to, the scheduler or 132 in FIG. 1, scheduler 300 in FIG. 3, or coarse-grained scheduler 400 in FIG. 4. The computing device may be implemented as a computing device, such as but is not limited to, a server in set of servers 124 in FIG. 1, host computing device 200 in FIG. 2, host computing device 1500, or host computing device 1600 in FIG. 16. Further, execution of the operations illustrated in FIG. 7 is not limited to a scheduler. One or more computer-readable storage media storing computer-readable instructions may execute to cause at least one processor to implement the operations illustrated in FIG. 7.

An identification of a VM to be placed on a host is received at 702. The VM to be placed on a host may be a powering-on VM or a VM that is being moved from one host to another host. A predetermined number of hosts is selected from a plurality of queues to generate a candidate set of hosts at 704. Resource statistics for a set of VMs and the candidate set of hosts is received at 706. The candidate set of hosts are analyzed using coarse-grained, resource-based optimization at 708. A host is selected based on analysis results at 710. An identified VM is placed on the selected host at 712. The process terminates thereafter.

In this example, a predetermined number of hosts are selected from a plurality of queues. In some examples, the predetermined number of hosts is selected from each queue in the plurality of queues to generate the candidate set of hosts.

The process in FIG. 7 is described as being implemented to perform coarse-grained optimizations with regard to VMs. However, in other examples, the optimizations are performed with regard to containers.

While the operations illustrated in FIG. 7 are described as being performed by a host computing device or a server, aspects of the disclosure contemplate that performance of the operations by other entities. For example, a cloud service associated with a cloud, such as cloud 102 in FIG. 1, may perform one or more of the operations.

Figure 8:
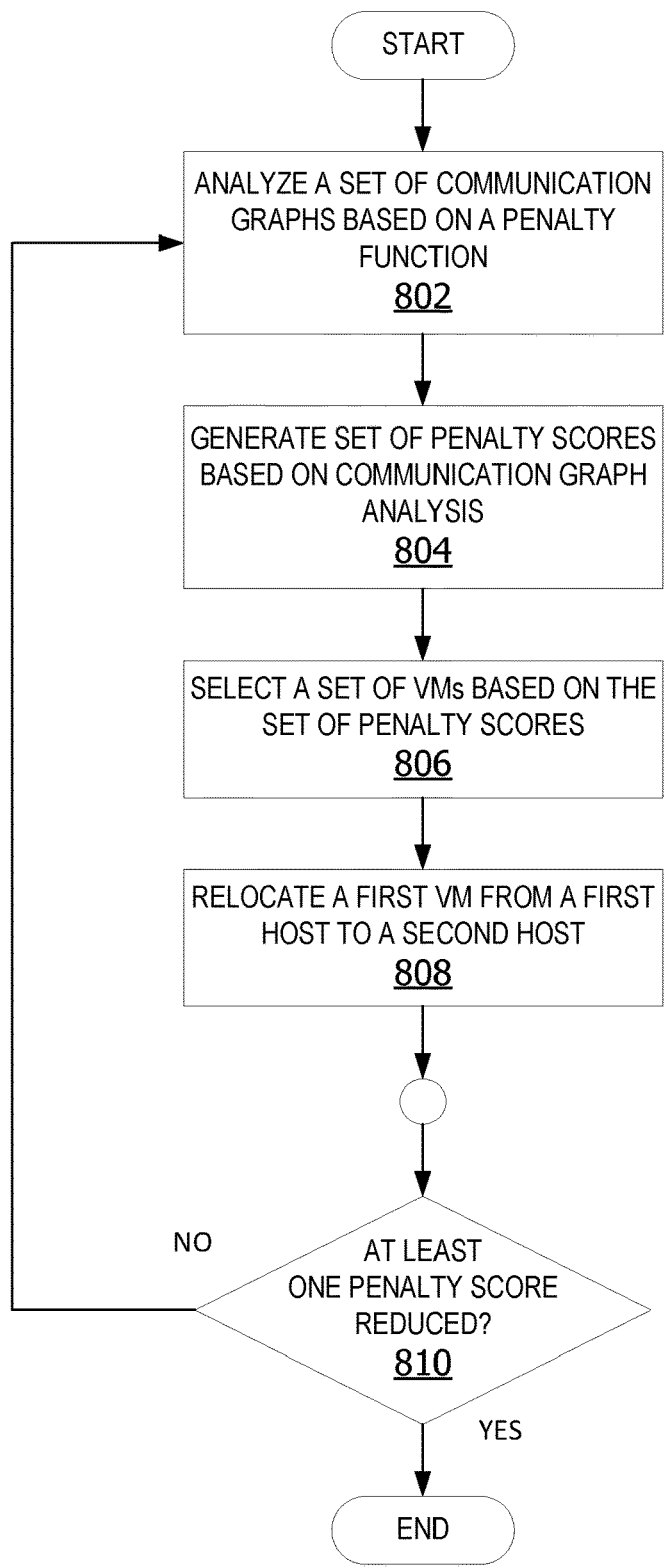
FIG. 8 is an exemplary flow chart illustrating operation of a fine-grained scheduler.

FIG. 8 is an exemplary flow chart illustrating operation of a fine-grained scheduler. The process shown in FIG. 8 may be performed by a scheduler on a computing device, such as, but not limited to, the scheduler 132 in FIG. 1, scheduler 300 in FIG. 3, or fine-grained scheduler 500 in FIG. 5. The computing device may be implemented as a computing device, such as but is not limited to, a server in set of servers 124 in FIG. 1, host computing device 200 in FIG. 2, host computing device 1500, or host computing device 1600 in FIG. 16. Further, execution of the operations illustrated in FIG. 8 is not limited to a scheduler. One or more computer-readable storage media storing computer-readable instructions may execute to cause at least one processor to implement the operations illustrated in FIG. 8.

A set of communication graphs associated with a plurality of VMs is analyzed based on a penalty function at 802. In this example, a set of penalty scores is generated based on communication graphs analysis at 804. A set of VMs are selected based on the set of penalty scores at 806. A first VM in the set of VMs is relocated from a first host to a second host at 808. A determination is made as to whether at least one penalty score is reduced at 810. If yes, the process terminates thereafter.

Returning to 810, if at least one penalty score is not reduced, the process returns to 802. The process iteratively executes 802-810 until at least one penalty score is reduced at 810. The process terminates thereafter.

The process in FIG. 8 is described as being implemented to perform fine-grained optimizations with regard to VMs. However, in other examples, the fine-grained optimizations are performed with regard to containers.

While the operations illustrated in FIG. 8 are described as being performed by a host computing device or a server, aspects of the disclosure contemplate that performance of the operations by other entities. For example, a cloud service associated with a cloud, such as cloud 102 in FIG. 1, may perform one or more of the operations.

Thus, the two-tiered resource scheduler in some examples performs initial placement, remediation of resource contention, as well as co-location of communicating VMs to improve application performance in a cluster. The coarse-grained scheduler performs initial placement and resource contention remediation based on resource shape, sampling, and vector dot product. The fine-grained, co-location scheduler uses distance and throughput based penalty function to identify and greedily co-locate communicating VMs.

A combination of simulation results and cluster experiments may be used to highlight gaps in current schedulers and demonstrate the strengths of the coarse-grained scheduler and the fine-grained scheduler. To evaluate performance of a scheduler in a large scale system, a trace-driven simulator and use sequences of snapshots from internal NIMBUS clusters containing more than one-hundred (100) hosts and one-thousand (1,000) VMs are used. A snapshot contains each VM's resource requirements, hosts' resource capacities, and other static information, such as, for example, the current VM-to-host mapping.

Figure 11:
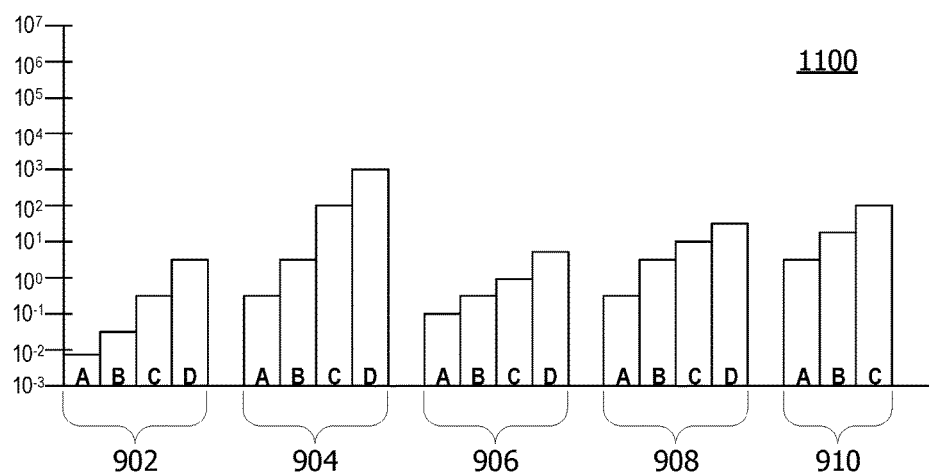
FIG. 11 is an exemplary graph illustrating algorithm runtime of different scheduling algorithms under different system sizes.

The simulator mimics the manner in which different coarse-grained optimization algorithms make VM-to-host mapping decisions using information available from a snapshot. Imbalance across hosts, cluster total utilization, and algorithm runtime are used to evaluate the effectiveness of an algorithm. To evaluate an algorithm in different system sizes, the snapshot is scaled horizontally to different system sizes. FIG. 9, FIG. 10, and FIG. 11 below illustrate how sampling-based, multiqueue-K algorithm for virtual computing instance scheduling compares to other algorithms when evaluated using this simulator.

FIG. 9 is an exemplary graph illustrating system utilization of different scheduling algorithms under different system sizes. The graph 900 shows total utilization in percentage (%) along the vertical y-axis and the various algorithms along the horizontal x-axis. The schedulers in this example include a random scheduler 902 as a lower bound, a dot product 904 without a fixed-size sampling, a state-of-art cluster scheduler (dot-rand-32) 906, a dot product with multiqueue-K algorithm 908 using a fixed-size host sampling, and a network aware distributed resource scheduler (DRS) 910. The multiqueue-K algorithm 908 in this example uses a "K" value of four (4). The multiqueue-K algorithm 908 pops the top four compatible host candidates from a set of queues.

The different system sizes in this example include 1,600 VMs on 64 hosts identified in the graph by an "A"; 6,250 VMs on 250 hosts identified by "B"; 25,000 VMs on 1,000 hosts indicated by "C"; and 100,000 VMs on 4,000 hosts indicated by "D" for each different algorithm.

FIG. 10 is an exemplary graph illustrating system imbalance of different scheduling algorithms under different system sizes. The graph 1000 shows imbalance (standard deviation norm, entitlement) along the vertical y-axis and the various algorithms along the horizontal x-axis. The algorithms in this example includes the random scheduler 902, the dot product 904 without a fixed-size sampling, the state-of-art cluster scheduler 906, the multiqueue-K algorithm 908 having a "K" value of four, and a network aware DRS 910. The different system sizes in this example include 640 VMs on 64 hosts indicated in the graph by "A"; 2,500 VMs on 250 hosts identified by a "B"; 10,000 VMs on 1,000 hosts identified by "C"; and 40,000 VMs on 4,000 hosts indicated by a "D" for each different algorithm.

FIG. 11 is an exemplary graph illustrating algorithm runtime of different scheduling algorithms under different system sizes. The graph 1100 shows imbalance (standard deviation norm, entitlement) along the vertical y-axis and the various algorithms along the horizontal x-axis. The algorithms in this example include a random scheduler 902 as a lower bound, a dot product 904 without a fixed-size sampling, a state-of-art cluster scheduler 906, a multiqueue-K algorithm 908 with a "K" value of 4, and a network aware DRS 910.

The different system sizes in this example include 1,600 VMs on 64 hosts shown by an "A"; 6,250 VMs on 250 hosts identified by "B"; 25,000 VMs on 1,000 hosts identified by a "C"; and 100,000 VMs on 4,000 hosts identified in the graph by a "D" for each different algorithm.

As shown in FIG. 9, FIG. 10, and FIG. 11 above, the dot product 904 algorithm achieves the highest utilization and the lowest imbalance, but because it compares all VMs and hosts, the algorithm runtime increases faster than other dot product with sampling and multiqueue as the system size increases. Applying pure sampling to dot product improves the runtime scalability. It also achieves similarly high utilization as the original algorithm. However, because it does not find the best candidates, it sacrifices imbalances.

The multiqueue-K algorithm 908 combines the advantages of sampling and exhaustive search. It achieves similarly high utilization and low imbalances as the original dot product 904 algorithm. Although the runtime of multiqueue algorithm 908 is around four times (4×) higher than pure sampling, it scales very well compared with original dot product 904 algorithm.

The network aware DRS 910 also achieves very low imbalance because it was designed to reduce imbalance. However, its exhaustive search increases the algorithm runtime drastically. Moreover, the DRS 910 cannot complete for the largest configuration due to its exhaustive search algorithm. In the examples shown in FIG. 9, FIG. 10, and FIG. 11, there are no bars indicated by "D" for the DRS 910.

Figure 12:
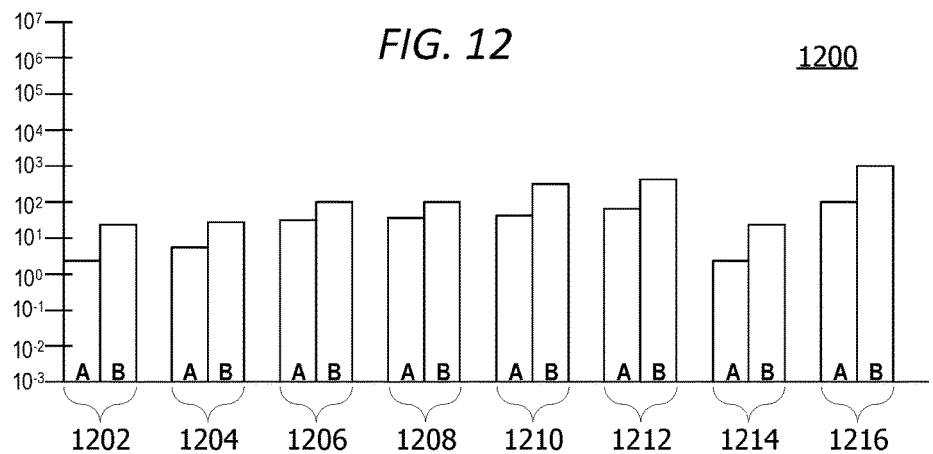
FIG. 12 is an exemplary graph illustrating algorithm runtime of a multiqueue-K algorithm using different top K candidates.

The graphs in FIG. 12 and FIG. 13 below, illustrate how the predetermined number of hosts "K" influences the multiqueue algorithm. FIG. 12 is an exemplary graph illustrating algorithm runtime of multiqueue-K algorithms using different top K candidates. The vertical y-axis of the graph 1200 shows time in seconds depicted in log scale. The horizontal x-axis identifies the scheduling algorithms. The algorithms in this example include a multiqueue-K algorithm with a "K" value of 1 at 1202 for 1 top candidate; multiqueue-K algorithm with a "K" value of 2 at 1204 that pops 2 top candidates at 1204; a multiqueue-K algorithm with a "K" value of 4 at 1206; a multiqueue-K algorithm with a "K" value of 8 at 1208; a multiqueue-K algorithm with a "K" value of 16 at 1210; a multiqueue-K algorithm with a "K" value of 32 at 1212; a state-of-art cluster scheduler (dot-rand-32) at 1214; and a dot product algorithm at 1216.

Figure 13:
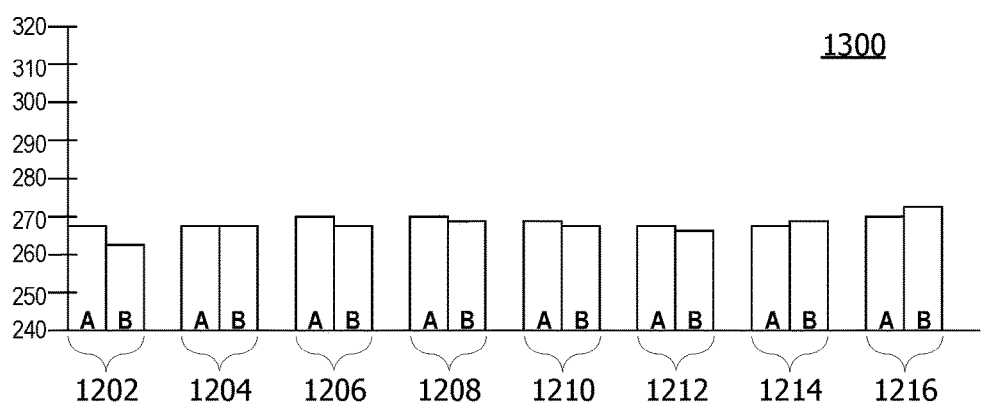
FIG. 13 is an exemplary graph illustrating system utilization of multiqueue-K algorithms using different top K candidates.

FIG. 13 is an exemplary graph illustrating system utilization of multiqueue-K algorithms using different top "K" candidates. The graph 1300 includes a vertical y-axis for total percentage (%) utilization. The horizontal x-axis identifies the scheduling algorithms. The algorithms in this example include a multiqueue-K algorithm for 1 top candidate at 1202; multiqueue-K algorithm with a "K" value of 2 at 1204; a multiqueue-K algorithm with a "K" value of 4 at 1206; a multiqueue-K algorithm with a "K" value of 8 at 1208; a multiqueue-K algorithm with a "K" value of 16 at 1210; a multiqueue-K algorithm with a "K" value of 32 at 1212; a state-of-art cluster scheduler (dot-rand-32) at 1214; and a dot product algorithm at 1216.

The graphs 1200 and 1300 illustrate how system utilization and algorithm runtime change as the number of candidates the algorithm considers in each queue is altered. A "K" value of 4 which results in comparing the top four candidates in each queue achieves most of the benefits while adding acceptable constant runtime overhead.

Figure 14:
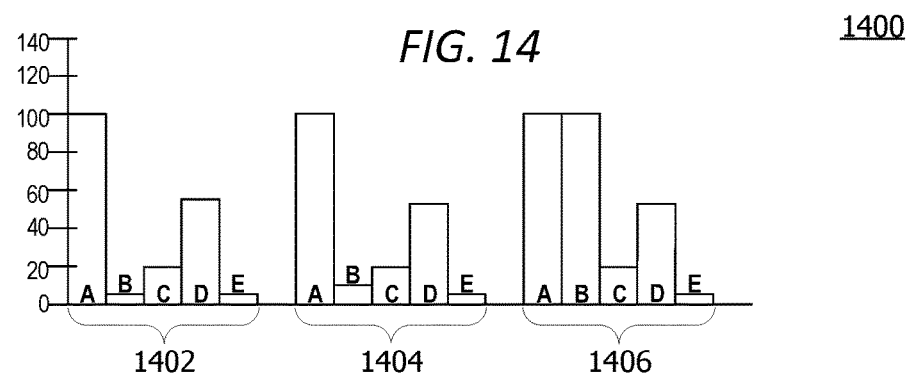
FIG. 14 is an exemplary graph illustrating reduction of communication cost of different scheduling algorithms over random scheduler.
Figure 15:
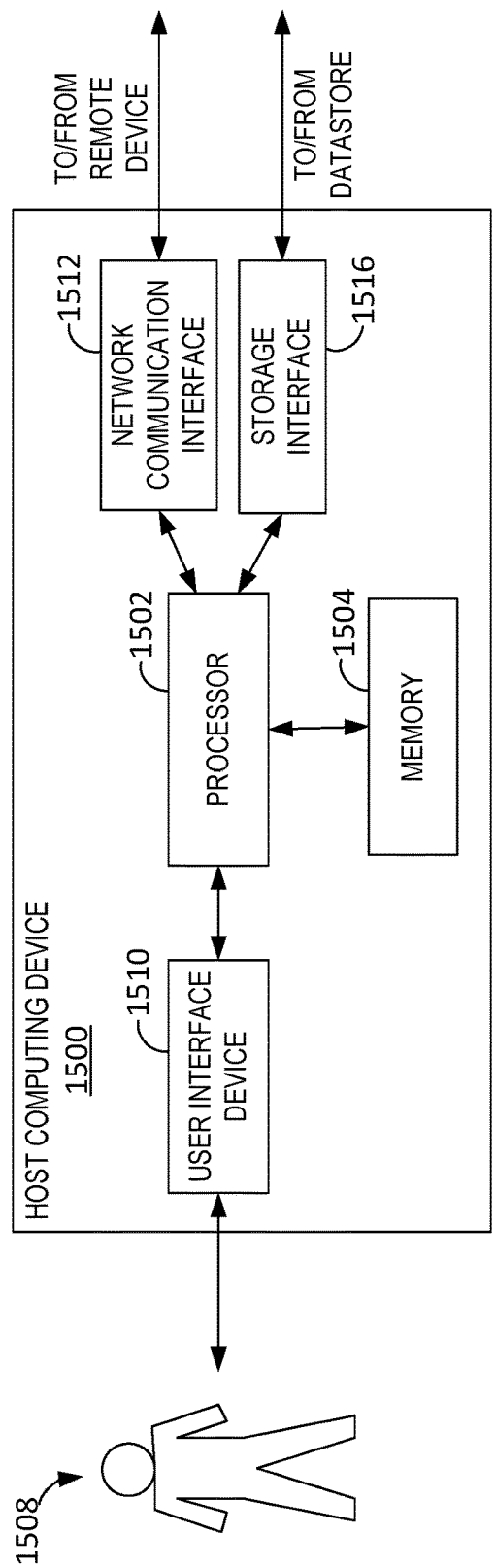
FIG. 15 is a block diagram of an example host computing device.
Figure 16:
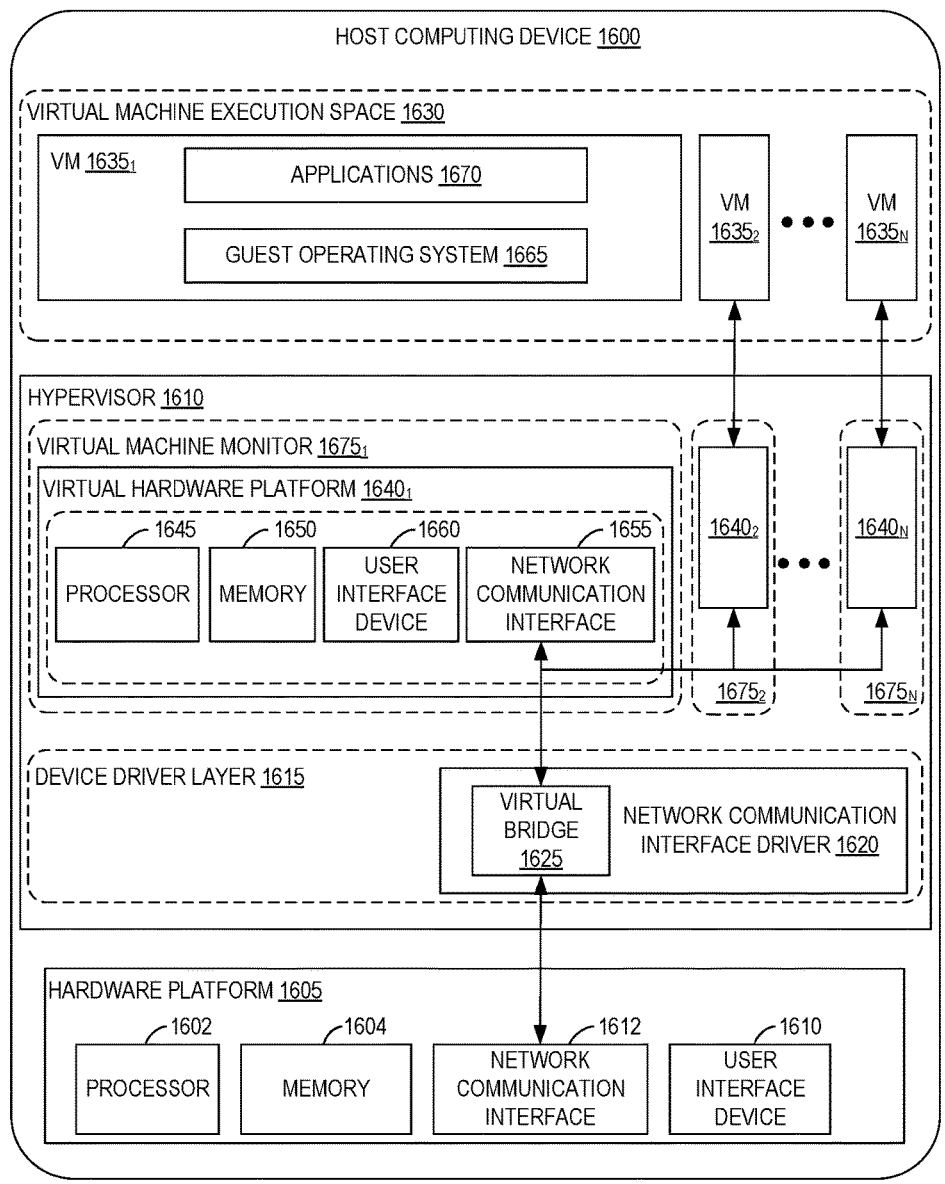
FIG. 16 is a block diagram of VMs instantiated on a host computing device.

In FIG. 14, FIG. 15, and FIG. 16 below, the same trace-driven simulator using sequences of snapshots is used to evaluate fine-grained optimization algorithms. Distance cost is defined as one (1) for intra-host, five (5) for inter-host, twenty-five (25) for inter-rack, and use total communication cost of a VM-to-host mapping as the metric to evaluate algorithms. The snapshots are gathered from production clusters. The snapshots do not contain VM communication graphs. Therefore, the snapshots are combined with customized snapshots containing the communication graphs of a REDIS web application deployed with different number of VMs.

FIG. 14 is an exemplary graph illustrating reduction of communication cost of different scheduling algorithms over random scheduler. The graph 1400 shows how the penalty-aware algorithm improves application performance. The vertical y-axis is a sum of communication cost in percentage (%) normalized to baseline.

Five algorithms are shown along the horizontal x-axis. The algorithms include a dot product algorithm indicated by an "A" without any fine-grained optimization; a greedy algorithm that tries to co-locate communicating VMs on a single host identified by a "B"; a greedy algorithm that tries to co-locate communicating VMs on a single rack identified by a "C", a state-of-art, greedy-based VM scheduler identified by a "D", and a penalty-aware algorithm co-locating VMs based on penalty scores identified by a "E".

The algorithms in this example are evaluated by comparing their total communication costs. The total communication costs are normalized to dot product without any fine-grained optimization. The number of communicating VMs are varied within a web application to see how the difference in communication graphs affects algorithm performance. In this example, the set of communicating VMs includes three (3) VMs at 1402; six (6) VMs at 1404; and nine (9) VMs at 1406.

When the size of the VMs in the set is small (e.g., 3), co-locating VMs into a single host is very effective because it is more likely enough space is available on a single host to accommodate all the VMs in a small group of VMs, such as shown by B at 1402. However, when the number of VMs in the group is larger and a size of the communication graph increases, it is less likely to co-locate all the VMs in the group onto a single host. Therefore, co-location in a single rack becomes more effective with a larger group of VMs than attempting to co-locate on a single host, as indicated by B and C at 1404 and 1406.

The state-of-art, greedy-based VM scheduler is stable across different cluster sizes. However, it performs coarse-grained and fine-grained optimization within a single pass, and thus reduces the effectiveness in both parts.

The penalty-aware algorithm shown at E performs equally well in both small size and large size. The penalty-aware algorithm performs well because it adapts to different schemes automatically.

The examples shown above are described as being implemented to place and migrate VMs. However, in other examples, the scheduler is implemented to place and migrate containers, or other virtual computing instances.

FIG. 15 is a block diagram of an example host computing device. A host computing device 1500 includes a processor 1502 for executing instructions. In some examples, executable instructions are stored in a memory 1504. Memory 1504 is any device allowing information, such as, but not limited to, executable instructions, to be stored and retrieved. For example, memory 1504 may include one or more random access memory (RAM) modules, flash memory modules, hard disks, solid state disks, and/or optical disks.

Host computing device 1500 may include a user interface device 1510 for receiving data from a user 1508 and/or for presenting data to user 1508. User 1508 may interact indirectly with host computing device 1500 via another computing device such as VMware's vCenter Server or another management device. User interface device 1510 may include, for example, a keyboard, a pointing device, a mouse, a stylus, a touch sensitive panel (e.g., a touch pad or a touch screen), a gyroscope, an accelerometer, a position detector, and/or an audio input device.

In some examples, the user interface device 1510 operates to receive data from the user 1508, while another device (e.g., a presentation device) operates to present data to user 1508. In other examples, the user interface device 1510 has a single component, such as a touch screen, that functions to both output data to user 1508 and receive data from the user 1508. In such examples, the user interface device 1510 operates as a presentation device for presenting information to user 1508. In such examples, the user interface device 1510 represents any component capable of conveying information to user 1508. For example, the user interface device 1510 may include, without limitation, a display device (e.g., a liquid crystal display (LCD), organic light emitting diode (OLED) display, or "electronic ink" display) and/or an audio output device (e.g., a speaker or headphones). In some examples, the user interface device 1510 includes an output adapter, such as a video adapter and/or an audio adapter. An output adapter is operatively coupled to the processor 1502 and configured to be operatively coupled to an output device, such as a display device or an audio output device.

The host computing device 1500 also includes a network communication interface 1512, which enables the host computing device 1500 to communicate with a remote device (e.g., another computing device) via a communication medium, such as a wired or wireless packet network. For example, the host computing device 1500 may transmit and/or receive data via the network communication interface 1512. The user interface device 1510 and/or network communication interface 1512 may be referred to collectively as an input interface and may be configured to receive information from the user 1508.

The host computing device 1500 further includes a storage interface 1516 that enables the host computing device 1500 to communicate with one or more data stores, which store virtual disk images, and/or software applications suitable for use with the methods described herein. In example examples, the storage interface 1516 couples the host computing device 1500 to a storage area network (SAN) (e.g., a Fibre Channel network) and/or to a network-attached storage (NAS) system (e.g., via a packet network). The storage interface 1516 may be integrated with network communication interface 1512.

FIG. 16 depicts a block diagram of VMs $1635_1$, $1635_2$ ... $1635_N$ that are instantiated on host computing device 1600. The host computing device 1600 includes a hardware platform 1605, such as an x86 architecture platform. The hardware platform 1605 may include a processor 1602, memory 1604, network communication interface 1612, user interface device 1610, and other input/output (I/O) devices, such as a presentation device 1606. A virtualization software layer is installed on top of the hardware platform 1605.

The virtualization software layer supports a VM execution space 1630 within which multiple VMs (VMs $1635_1$-$1635_N$) may be concurrently instantiated and executed. Hypervisor 1610 includes a device driver layer 1615, and maps physical resources of the hardware platform 1605 (e.g., processor 1602, memory 1604, network communication interface 1612, and/or user interface device 1610) to "virtual" resources of each of the VMs $1635_1$-$1635_N$ such that each of the VMs $1635_1$-$1635_N$ has its own virtual hardware platform (e.g., a corresponding one of virtual hardware platforms $1640_1$-$1640_N$), each virtual hardware platform having its own emulated hardware (such as a processor 1645, a memory 1650, a network communication interface 1655, a user interface device 1660 and other emulated I/O devices in VM $1635_1$).

Hypervisor 1610 may manage (e.g., monitor, initiate, and/or terminate) execution of VMs $1635_1$-$1635_N$ according to policies associated with hypervisor 1610, such as a policy specifying that VMs $1635_1$-$1635_N$ are to be automatically respawned upon unexpected termination and/or upon initialization of hypervisor 1610. In addition, or alternatively, the hypervisor 1610 may manage execution VMs $1635_1$-$1635_N$ based on requests received from a device other than host computing device 1601. For example, the hypervisor 1610 may receive an execution instruction specifying the initiation of execution of first VM $1635_1$ from a management device via the network communication interface 1612 and execute the execution instruction to initiate execution of first VM $1635_1$.

In some examples, the memory 1650 in the first virtual hardware platform $1640_1$ includes a virtual disk that is associated with or "mapped to" one or more virtual disk images stored on a disk (e.g., a hard disk or solid state disk) of the host computing device 1600. The virtual disk image represents a file system (e.g., a hierarchy of directories and files) used by the first VM $1635_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

The device driver layer 1615 includes, for example, a communication interface driver 1620 that interacts with the network communication interface 1612 to receive and transmit data from, for example, a LAN connected to the host computing device 1600. The communication interface driver 1620 also includes a virtual bridge 1625 that simulates the broadcasting of data packets in a physical network received from one communication interface (e.g., network communication interface 1612) to other communication interfaces (e.g., the virtual communication interfaces of VMs $1635_1$-$1635_N$). Each virtual communication interface for each VM $1635_1$-$1635_N$, such as the network communication interface 1655 for the first VM $1635_1$, may be assigned a unique virtual MAC address that enables virtual bridge 1625 to simulate the forwarding of incoming data packets from the network communication interface 1612. In an example, the network communication interface 1612 is an Ethernet adapter that is configured in "promiscuous mode" such that all Ethernet packets that it receives (rather than just Ethernet packets addressed to its own physical MAC address) are passed to virtual bridge 1625, which, in turn, is able to further forward the Ethernet packets to VMs $1635_1$-$1635_N$. This configuration enables an Ethernet packet that has a virtual MAC address as its destination address to properly reach the VM in the host computing device 1600 with a virtual communication interface that corresponds to such virtual MAC address.

The virtual hardware platform $1640_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1665 in order to execute applications 1670 for an instantiated VM, such as the first VM $1635_1$. The virtual hardware platforms $1640_1$-$1640_N$ may be considered to be part of the VM monitors (VMM) $1675_1$-$1675_N$ that implement virtual system support to coordinate operations between the hypervisor 1610 and corresponding VMs $1635_1$-$1635_N$. Those with ordinary skill in the art will recognize that the various terms, layers, and categorizations used to describe the virtualization components in FIG. 16 may be referred to differently without departing from their functionality or the spirit or scope of the disclosure. For example, the virtual hardware platforms $1640_1$-$1640_N$ may also be considered to be separate from VMs $1675_1$-$1675_N$, and VMMs $1675_1$-$1675_N$ may be considered to be separate from hypervisor 1610. One example of the hypervisor 1610 that may be used in an example of the disclosure is included as a component in VMware's ESX brand software, which is commercially available from VMware, Inc.

Certain examples described herein involve a hardware abstraction layer on top of a host computer (e.g., server). The hardware abstraction layer allows multiple containers to share the hardware resource. These containers, isolated from each other, have at least a user application running therein.

The hardware abstraction layer thus provides benefits of resource isolation and allocation among the containers. In some examples, VMs may be used alternatively or in addition to the containers, and hypervisors may be used for the hardware abstraction layer. In these examples. each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices. In some examples, the computing system environment includes a first computer system at a first site and/or a second computer system at a second site. The first computer system at the first site in some non-limiting examples executes program code, such as computer readable instructions stored on non-transitory computer readable storage medium.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices, network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for a coarse-grained scheduler. For example, the elements illustrated in FIG. 1, FIG. 2, FIG. 3, FIG. 4, and FIG. 5, such as when encoded to perform the operations illustrated in FIG. 6, FIG. 7, and FIG. 8 constitute exemplary means for receiving an identification of a virtual machine (VM) to be placed on a host in a plurality of hosts within a cluster; exemplary means for selecting a predetermined number of hosts from each queue in a plurality of queues to generate a candidate set of hosts; exemplary means for retrieving resource statistics for a set of VMs associated and the candidate set of hosts; exemplary means for analyzing the candidate set of hosts in accordance with a coarse-grained, resource-based optimization to select a host for the identified VM; and exemplary means for placing the identified VM on the selected host.

The examples illustrated and described herein as well as examples not specifically described herein but within the scope of aspects of the disclosure also constitute exemplary means for a fine-grained scheduler. For example, the elements illustrated in FIG. 1, FIG. 2, FIG. 3, FIG. 4, and FIG. 5, such as when encoded to perform the operations illustrated in FIG. 6, FIG. 7, and FIG. 8 constitute exemplary means for analyzing a set of communication graphs associated with the plurality of VMs to generate a set of penalty scores; exemplary means for selecting a set of VMs for relocation based on the set of penalty scores; and exemplary means for relocating a first VM in the set of VMs from a first host in the cluster to a second host in the cluster to minimize a distance between the first VM and a second VM in the plurality of VMs.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for resource scheduling, said system comprising:
   at least one memory associated with a set of servers in a cluster, the at least one memory storing a fine-grained scheduler;
   a plurality of virtual computing instances on the set of servers; and
   at least one processor programmed to execute the fine-grained scheduler to:
      analyze a set of communication graphs associated with the plurality of virtual computing instances to generate a set of penalty scores;
      select a set of virtual computing instances for relocation based on the set of penalty scores; and
      relocate a first virtual computing instance in the set of virtual computing instances from a first host in the cluster to a second host in the cluster to minimize a distance between the first virtual computing instance and a second virtual computing instance in the plurality of virtual computing instances, relocating the first virtual computing instance reduces at least one penalty score in the set of penalty scores associated with the set of virtual computing instances.

2. The system of claim 1, further comprising:
   a selection component, wherein the at least one processor is further programmed to execute the selection component to initialize a plurality of queues, each queue in the plurality of queues is associated with at least one resource, the at least one resource for each queue is a different resource or combination of resources, wherein a queue comprises an ordered list of hosts, and wherein each host in the plurality of hosts is assigned to at least one queue.

3. The system of claim 2, further comprising:
   a selection component, wherein the at least one processor further executes the selection component to select a predetermined number of hosts from each queue in a plurality of queues to generate a candidate set of hosts.

4. The system of claim 3, further comprising:
   a coarse-grained analyzer, wherein the at least one processor is further programmed to execute the coarse-grained analyzer to:
   retrieve resource statistics for virtual computing instances in the candidate set of hosts and the resource statistics for the hosts in the candidate set of hosts;
   analyze the resource statistics based on a coarse-grained optimization to select a host for placement of a given virtual computing instance, wherein the host is selected based on optimization of network resource; and
   place the given virtual computing instance on the selected host.

5. The system of claim 1, further comprising:
   a group tag, wherein the at least one processor is further programmed to tag each virtual computing instance in a set of virtual computing instances with the group tag, wherein the group tag indicates virtual computing instances in the set of virtual computing instances are communicating virtual computing instances.

6. The system of claim 1, wherein the at least one processor is further programmed to execute the fine-grained scheduler to:
   check a tag associated with a given virtual computing instance to determine whether the given virtual computing instance is to be placed on a same host as one or more other virtual computing instances to minimize a distance between virtual computing instances.

7. The system of claim 1, wherein the at least one processor is further programmed to execute the fine-grained scheduler to:
   update host resource capacity of the second host to deduct resources consumed by a given virtual computing instance being placed on the second host.

8. A method comprising:
   analyzing a set of communication graphs associated with the plurality of virtual computing instances to generate a set of penalty scores;
   selecting a set of virtual computing instances for relocation based on the set of penalty scores; and
   relocating a first virtual computing instance in the set of virtual computing instances from a first host in the cluster to a second host in the cluster to minimize a distance between the first virtual computing instance and a second virtual computing instance in the plurality of virtual computing instances, relocating the first virtual computing instance reduces at least one penalty score in the set of penalty scores associated with the set of virtual computing instances.

9. The method of claim 8, further comprising:
   initializing a plurality of queues, each queue in the plurality of queues being associated with at least one resource, the at least one resource for each queue comprising a different resource or combination of resources, wherein a queue comprises an ordered list of hosts, and wherein each host in the plurality of hosts is assigned to at least one queue.

10. The method of claim 9, further comprising selecting a predetermined number of hosts from each queue in a plurality of queues to generate a candidate set of hosts.

11. The method of claim 10, further comprising:
   retrieving resource statistics for virtual computing instances in the candidate set of hosts and the resource statistics for the hosts in the candidate set of hosts;

analyzing the resource statistics based on a coarse-grained optimization to select a host for placement of a given virtual computing instance, wherein the host is selected based on optimization of network resource; and placing the given virtual computing instance on the selected host.

12. The method of claim 8, further comprising:

tagging each virtual computing instance in a set of virtual computing instances with the group tag, wherein the group tag indicates virtual computing instances in the set of virtual computing instances are communicating virtual computing instances.

13. The method of claim 8, further comprising checking a tag associated with a given virtual computing instance to determine whether the given virtual computing instance is to be placed on a same host as one or more other virtual computing instances to minimize a distance between virtual computing instances.

14. The method of claim 8, further comprising updating a host resource capacity of the second host to deduct resources consumed by a given virtual computing instance being placed on the second host.

* * * * *